US006594712B1

United States Patent
Pettey et al.

(10) Patent No.: US 6,594,712 B1
(45) Date of Patent: Jul. 15, 2003

(54) INIFINIBAND CHANNEL ADAPTER FOR PERFORMING DIRECT DMA BETWEEN PCI BUS AND INIFINIBAND LINK

(75) Inventors: Christopher Pettey, Cedar Park, TX (US); Lawrence H. Rubin, Austin, TX (US)

(73) Assignee: Banderacom, Inc., Austin, TX (US)

( * ) Notice: Subject to any disclaimer, the term of this patent is extended or adjusted under 35 U.S.C. 154(b) by 477 days.

(21) Appl. No.: 09/693,405

(22) Filed: Oct. 20, 2000

(51) Int. Cl.[7] .................................................. G06F 13/28
(52) U.S. Cl. .......................... 710/22; 710/26; 710/28; 710/36; 709/212
(58) Field of Search .......................... 710/5–7, 22–28, 710/36–51; 709/208–216

(56) References Cited

U.S. PATENT DOCUMENTS

| | | | | |
|---|---|---|---|---|
| 5,088,031 A | * | 2/1992 | Takasaki et al. | 709/100 |
| 5,644,712 A | * | 7/1997 | Coscarella et al. | 710/36 |
| 5,659,794 A | | 8/1997 | Caldarale et al. | |
| 5,713,044 A | * | 1/1998 | Gillespie et al. | 710/22 |
| 5,758,075 A | | 5/1998 | Graziano et al. | |
| 5,914,955 A | | 6/1999 | Rostoker et al. | |
| 5,953,511 A | | 9/1999 | Sescila, III et al. | |
| 5,991,797 A | * | 11/1999 | Futral et al. | 709/216 |
| 6,085,278 A | * | 7/2000 | Gates et al. | 710/22 |

OTHER PUBLICATIONS

Ioannis Schoinas & Mark D. Hill, Address Translation Mechanisms in Network Interfaces, pp 219–230, Copyright 1998, Madison, WI.

* cited by examiner

Primary Examiner—Kim Huynh
(74) Attorney, Agent, or Firm—E. Alan Davis; James W. Huffman

(57) ABSTRACT

An Infiniband channel adapter for performing direct data transfers between a PCI bus and an Infiniband link without double-buffering the data in system memory. A local processor programs the channel adapter to decode addresses in a range of the PCI bus address space dedicated to direct transfers. When an I/O controller attached to the PCI bus transfers data from an I/O device to an address in the dedicated range, the channel adapter receives the data into an internal buffer and creates an Infiniband RDMA Write packet for transmission to virtual address within a remote Infiniband node. When the channel adapter receives an Infiniband RDMA Read Response packet, the channel adapter provides the packet payload data to the I/O controller at a PCI address in the dedicated range. A plurality of programmable address range registers facilitates multiple of the direct transfers concurrently by dividing the dedicated address range into multiple sub-ranges. The address range registers enable random mapping between the address sub-ranges and multiple internal buffers for receiving and transmitting Infiniband RDMA packets.

41 Claims, 22 Drawing Sheets

Direct RDMA Write Data Flow

IB TCA

Packet Memory Block (PMB) Format

| Total Transfer Length | Write Byte Count | Read Response Payload Length | Packet Memory Block Number | PCI Valid | BR Valid | Type |
|---|---|---|---|---|---|---|
| 602 | 604 | 606 | 608 | 612 | 614 | 616 |

Address Range Register (ARR) Format

DRDMA PCI Address Ranges

Queue Pair (QP) Operation

Work Queue and Completion Queue Operation

FIG. 8

| Operation Type 802 |
| --- |
| Destination QP 804 |
| Remote Virtual Address 806 |
| Path MTU 808 |
| SGL local address 812 |
| nextResponse 814 |
| other fields 816 |

800

Work Queue Element (WQE)

FIG. 9

| Direct 902 |
| --- |
| Address Range Register (ARR) Number 904 |
| Total Length 906 |
| other fields 908 |
| Local Address 0  912 |
| Local Length 0  922 |
| Local Address 1  914 |
| Local Length 1  924 |
| Local Address 2  916 |
| Local Length 2  926 |
| Local Address 3  918 |
| Local Length 3  928 |

900

Scatter/Gather List (SGL)

SEND Packet 1000

RDMA Write Packet 1100

RDMA Read Request Packet 1200

RDMA Read Response Packet 1300

I/O Read Operation

I/O Write Operation

FIG. 17
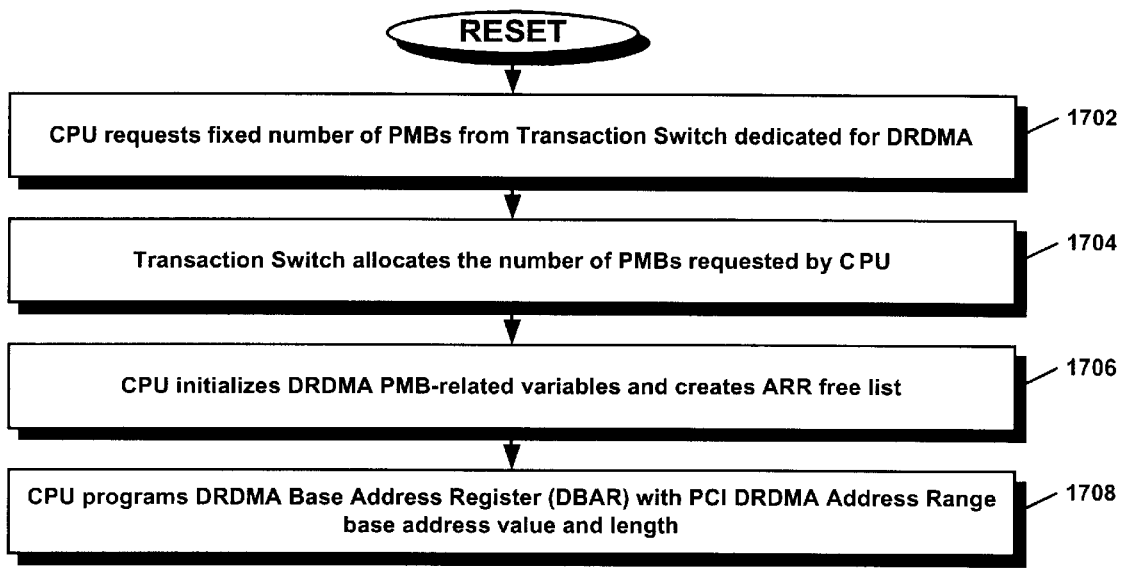
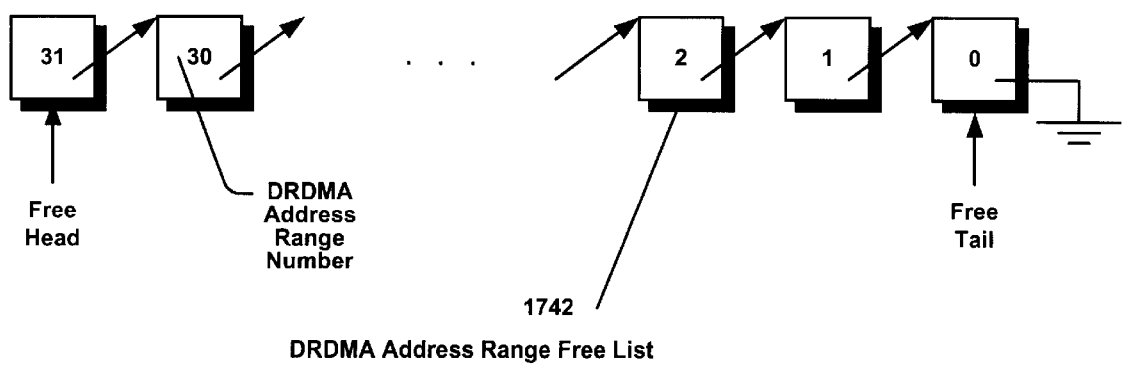
DRDMA Address Range Free List
DRDMA-related Initialization Direct RDMA Write

Direct RDMA Write Data Flow

PCI Address to ARR and PMB Translation

DRDMA Address Range to PMB Payload Region Mapping

WQE to PMB Translation

Small MTU Operation

Direct RDMA Read

Direct RDMA Read Data Flow

RDMA Read Response Packet to ARR Translation

INIFINIBAND CHANNEL ADAPTER FOR PERFORMING DIRECT DMA BETWEEN PCI BUS AND INIFINIBAND LINK

BACKGROUND OF THE INVENTION

1. Field of the Invention

This invention relates in general to the Infiniband high-speed serial link architecture, and more particularly to a method for performing remote direct memory access data transfers through the architecture.

2. Description of the Related Art

The need for speed in transferring data between computers and their peripheral devices, such as storage devices and network interface devices, and between computers themselves is ever increasing. The growth of the Internet is one significant cause of this need for increased data transfer rates.

The need for increased reliability in these data transfers is also ever growing. These needs have culminated in the development of the Infiniband™ Architecture (IBA), which is a high speed, highly reliable, serial computer interconnect technology. The IBA specifies interconnection speeds of 2.5 Gbps (Gigabits per second), 10 Gbps and 30 Gbps between IB-capable computers and I/O units, referred to collectively as IB end nodes.

One feature of the IBA that facilitates high-speed data transfers is the Remote Direct Memory Access (RDMA) operation. The IBA specifies an RDMA Write and an RDMA Read operation for transferring large amounts of data between IB nodes. The RDMA Write operation is performed by a source IB node transmitting one or more RDMA Write packets including payload data to the destination IB node. The RDMA Read operation is performed by a requesting IB node transmitting an RDMA Read Request packet to a responding IB node and the responding IB node transmitting one or more RDMA Read Response packets including payload data.

One useful feature of RDMA Write/Read packets is that they include a virtual address identifying a location in the system memory of the destination/responding IB node to/from which the data is to be transferred. That is, an IB Channel Adapter in the destination/responding IB node performs the virtual to physical translation. This feature alleviates the operating system in the destination/responding IB node from having to perform the virtual to physical translation. This facilitates, for example, application programs being able to directly specify virtual addresses of buffers in their system memory without having to involve the operating system in an address translation, or even more importantly, in a copy of the data from a system memory buffer to an application memory buffer.

An IB Channel Adapter (CA) is a component in IB nodes that generates and consumes IB packets, such as RDMA packets. A Channel Adapter connects a bus within the IB node that is capable of accessing the IB node memory, such as a PCI bus, processor bus or memory bus, with the IB network. In the case of an IB I/O node, the CA also connects I/O devices such as disk drives or network interface devices, or the I/O controllers connected to the I/O devices, with the IB network. A CA on an IB I/O node is commonly referred to as a Target Channel Adapter (TCA) and an IB processor node is commonly referred to as a Host Channel Adapter (HCA).

A common example of an IB I/O node is a RAID (Redundant Array of Inexpensive Disks) controller or an Ethernet controller. An IB I/O node such as this typically includes a local processor and local memory coupled together with a TCA, and I/O controllers connected to I/O devices. The conventional method of satisfying an RDMA operation in such an IB I/O node is to buffer the data in the local memory when transferring data between the I/O controllers and the IB network.

For example, in performing a disk read operation, the local processor on the IB I/O node would program the I/O controller to fetch data from the disk drive. The I/O controller would transfer the data from the disk into the local memory. Then the processor would program the TCA to transfer the data from the local memory to the IB network.

For a disk write, The TCA would receive the data from the IB network and transfer the data into the local memory. Then the processor would program the I/O controller to transfer the data from the local memory to the disk drive. This conventional approach is referred to as "double-buffering" the data since there is one transfer across the local bus into memory and another transfer across the local bus out of memory.

The double-buffering solution has at least two drawbacks. First, the data transfers into and out of memory consume twice as much of the local memory and local bus bandwidth as a direct transfer from the I/O controller to the TCA. This may prove detrimental in achieving the high-speed data transfers boasted by the IBA.

To illustrate, assume the local bus is a 64-bit wide 66 MHz PCI bus capable of sustaining a maximum theoretical bandwidth of 4 Gbps. With the double buffering solution, the effective bandwidth of the PCI bus is cut in half to 2 Gbps. Assuming a realistic efficiency on the bus of 80%, the effective bandwidth is now 1.6 Gbps. This is already less than the slowest transfer rate specified by IB, which is 2.5 Gbps.

To illustrate again, assume the local memory controller is a 64-bit wide, 100 MHz SDRAM controller capable of sustaining a maximum theoretical bandwidth of 6 Gbps. Again, assuming the conventional double buffering solution and an 80% efficiency yields an effective bandwidth of 2.4 Gbps. Clearly, this leaves no room in such an I/O node architecture for expansion to the higher IB transfer speeds.

The second drawback of the double buffering solution is latency. The total time to perform an I/O operation is the sum of the actual data transfer time and the latency period. The latency is the time involved in setting up the data transfer. No data is being transferred during the latency period. The double buffering solution requires more time for the local processor to set up the data transfer. The local processor not only sets up the initial transfer into local memory, but also sets up the transfer out of memory in response to an interrupt signifying completion of the transfer into local memory.

As data transfer rates increase, the data transfer component of the overall I/O operation time decreases. Consequently, the local processor execution latency time becomes a proportionately larger component of the overall I/O operation time, since the processor latency does not typically decrease proportionately to the data transfer time. The negative impact of latency is particularly detrimental for I/O devices with relatively small units of data transfer such as network interface devices transferring IP packets. Thus, the need for reducing or eliminating latency is evident.

Therefore, what is needed is an IB CA capable of transferring data directly between a local bus, such as a PCI bus, and an IB link without double buffering the data in local memory.

SUMMARY

To address the above-detailed deficiencies, it is an object of the present invention to provide an Infiniband channel adapter that transfers data directly between a local bus and an Infiniband link without double buffering the data in system memory. Accordingly, in attainment of the aforementioned object, it is a feature of the present invention to provide an Infiniband channel adapter that includes a local bus interface for coupling the channel adapter to an I/O controller by a local bus. The local bus interface receives data from the I/O controller if a local bus address of the data is within a predetermined address range of the local bus address space. The channel adapter also includes a bus router, in communication with the local bus interface, that creates an Infiniband RDMA Write packet including the data in response to the local bus interface receiving the data from the I/O controller. The channel adapter then transmits the created packet to a remote Infiniband node that previously requested the data.

An advantage of the present invention is that it avoids the reduction in useable bandwidth of the local bus and of a system memory by not double-buffering the data, but instead transferring the data directly from the I/O controller to the channel adapter for transmission on the Infiniband wire. Another advantage of the present invention is that it reduces local processor latency by not involving the local processor in setting up a double-buffered transfer.

In another aspect, it is a feature of the present invention to provide an Infiniband channel adapter that includes a bus router that receives an Infiniband RDMA Read Response packet, having a payload of data, transmitted by a remote Infiniband node. The channel adapter also includes a local bus interface, in communication with the bus router, that provides the payload of data to an I/O controller coupled to the local bus interface by a local bus if a local bus address specified by the I/O controller is within a predetermined address range of the local bus address space.

In yet another aspect, it is a feature of the present invention to provide an Infiniband I/O unit that includes an Infiniband channel adapter, an I/O controller, coupled to the channel adapter by a local bus, and a processor. The processor programs the I/O controller to transfer data to the channel adapter on the local bus at an address within a predetermined address range of the local bus address space dedicated for direct data transfers from the I/O controller to the channel adapter. The channel adapter receives the data from the I/O controller and creates an Infiniband RDMA Write packet including the data for transmission to a remote Infiniband node only if the address is within the predetermined address range.

In yet another aspect, it is a feature of the present invention to provide An Infiniband I/O unit that includes an Infiniband channel adapter, for receiving an Infiniband RDMA Read Response packet including a payload of data transmitted from a remote Infiniband node, an I/O controller, coupled to the channel adapter by a local bus and a processor. The processor programs the I/O controller to transfer the data in the payload from the channel adapter on the local bus at an address within a predetermined address range of the local bus address space dedicated for direct data transfers from the channel adapter to the I/O controller. The channel adapter provides the data to the I/O controller only if the address is within the predetermined address range.

It is also an object of the present invention to provide a method for translating virtual addresses of remote Infiniband nodes to local addresses on a local Infiniband node in a way that facilitates direct transfers between a local bus I/O controller and an Infiniband link of the local Infiniband node.

In yet another aspect, it is a feature of the present invention to provide a method for translating Infiniband remote virtual addresses to local addresses. The method includes a local Infiniband node receiving in a first Infiniband packet a first virtual address of a first memory location in a remote Infiniband node. The method further includes allocating a local address within a local address space of a local bus on the local node for transferring first data directly between an I/O controller of the local node and an Infiniband channel adapter of the local node in response to the receiving the first virtual address. The method further includes the local Infiniband node receiving in a second Infiniband packet a second virtual address of a second memory location in the remote Infiniband node, wherein the first and second virtual addresses are spatially disparate. The method further includes allocating the local address for transferring second data directly between the I/O controller and the channel adapter in response to the receiving the second virtual address.

An advantage of the present invention is that it enables translating of multiple different virtual addresses in a remote IB node into the same local address bus space. That is, the local address space is reusable with respect to the remote virtual address space that may be much larger than the local address space.

In yet another aspect, it is a feature of the present invention to provide a method for translating Infiniband remote virtual addresses to local addresses. The method includes a local Infiniband node receiving in a first Infiniband packet a first virtual address of a first memory location in a first remote Infiniband node. The method further includes allocating a local address within a local address space of a local bus on the local node for transferring first data directly between an I/O controller of the local node and an Infiniband channel adapter of the local node in response to the receiving the first virtual address. The method further includes the local Infiniband node receiving in a second Infiniband packet a second virtual address of a second memory location in a second remote Infiniband node. The method further includes allocating the local address for transferring second data directly between the I/O controller and the channel adapter in response to the receiving the second virtual address.

An advantage of the present invention is that it enables translating of virtual addresses of multiple different remote IB nodes into the same local address bus space. That is, the local address space is reusable with respect to the potentially large mapped virtual address spaces of many remote hosts accumulated together and potentially overlapping in their individual virtual address spaces.

In yet another aspect, it is a feature of the present invention to provide a method for translating Infiniband remote virtual addresses to local addresses. The method includes a local Infiniband node receiving in a first Infiniband packet a virtual address of a memory location in a remote Infiniband node. The method further includes allocating a first local address within a local address space of a local bus on the local node for transferring first data directly between an I/O controller of the local node and an Infiniband channel adapter of the local node in response to the receiving the virtual address in the first packet. The method further includes receiving in a second Infiniband packet the virtual address of the memory location in the remote Infiniband node, by the local Infiniband node. The method further includes allocating a second local address for transferring second data directly between the I/O controller and the channel adapter in response to the receiving the virtual address in the second packet.

BRIEF DESCRIPTION OF THE DRAWINGS

These and other objects, features, and advantages of the present invention will become better understood with regard to the following description, and accompanying drawings where:

FIG. 8 is a block diagram of a Work Queue Entry according to the present invention.

FIG. 9 is a block diagram of a Scatter/Gather List according to the present invention.

FIG. 17 is a flowchart illustrating steps in initialization of the TCA of FIG. 2 related to Direct RDMA operation according to the present invention.

DETAILED DESCRIPTION

Figure 1:
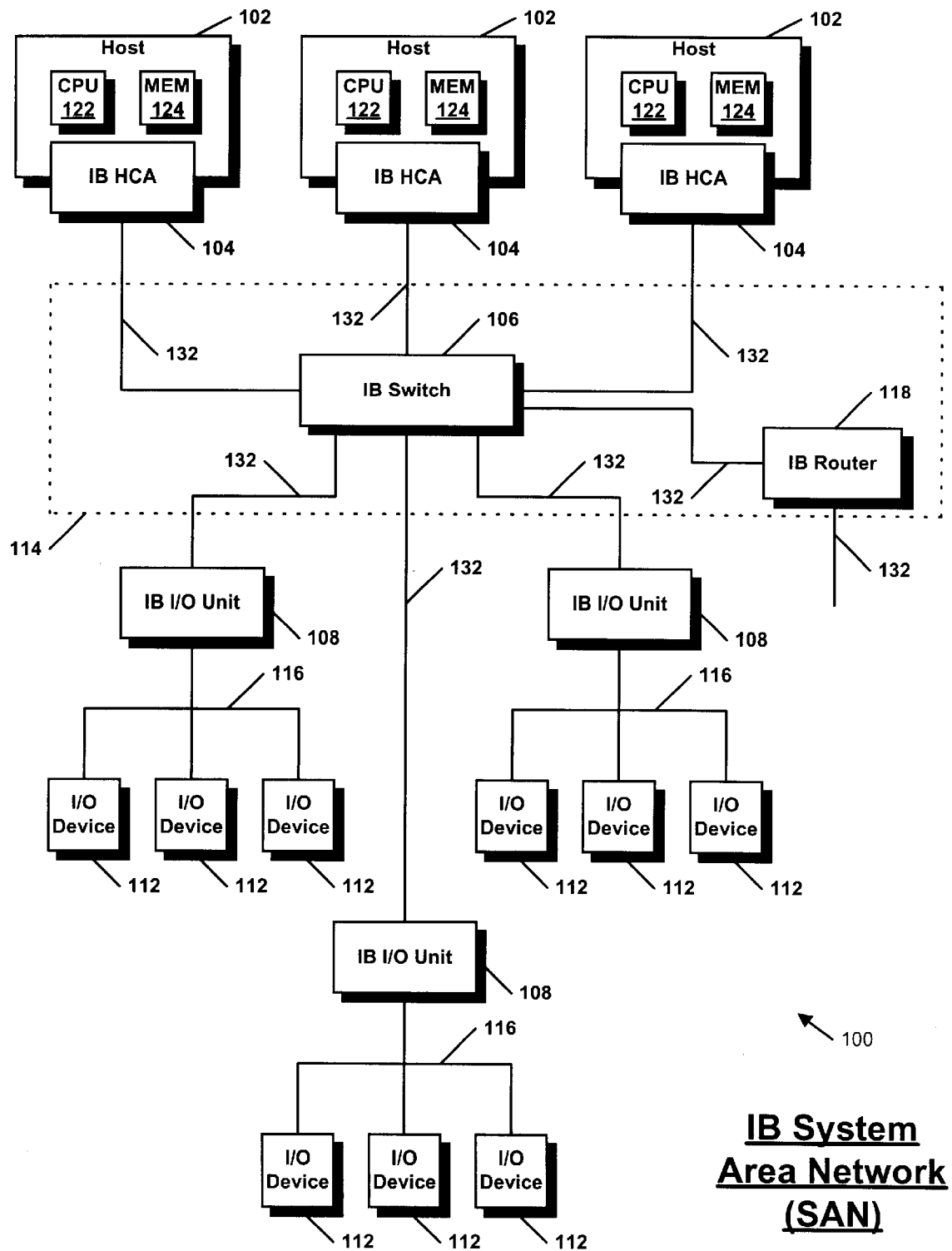
FIG. 1 is a block diagram of an Infiniband System Area Network according to the present invention.

Referring to FIG. 1, a block diagram of an Infiniband (IB) System Area Network (SAN) 100 according to the present invention is shown. IB SANs such as SAN 100 are described in detail in the Infiniband Architecture Specification Volume 1 Release 0.90, Mar. 31, 2000, which is hereby incorporated by reference. The SAN 100 includes a plurality of hosts 102. The hosts 102 are IB processor end nodes, such as server computers, that comprise at least a CPU 122 and memory 124 complex. Each of the hosts 102 includes one or more IB Host Channel Adapters (HCA) 104 for interfacing the hosts 102 to an IB fabric 114. The IB fabric 114 is comprised of one or more IB Switches 106 and IB Routers 118 connected by a plurality of IB serial links 132. For example, an HCA 104 may be coupled to a host 102 via a PCI bus or the HCA 104 may be coupled directly to the memory and/or processor bus of the host 102.

The SAN 100 also includes a plurality of IB I/O units 108 coupled to the IB fabric 114. The IB hosts 102 and IB I/O units 108 are referred to collectively as IB end nodes. The IB end nodes are coupled by the IB switch 106 that connects the various IB links 132 in the IB fabric 114. The collection of end nodes shown comprises an IB subnet. The IB subnet may be coupled to other IB subnets (not shown) by the IB router 118 coupled to the IB switch 106.

Coupled to the I/O units 108 are a plurality of I/O devices 112, such as disk drives, network interface controllers, tape drives, CD-ROM drives, graphics devices, etc. The I/O units 108 may comprise various types of controllers, such as a RAID (Redundant Array of Inexpensive Disks) controller. The I/O devices 112 may be coupled to the I/O units 108 by any of various interfaces, including SCSI (Small Computer System Interface), Fibre-Channel, Ethernet, IEEE 1394, etc.

A host 102 transmits a packet to an I/O unit 108 to request a transfer of data between an I/O device 112 coupled to the I/O unit 108 and a location in the host memory 124 specified by a virtual address in the packet. Multiple of the hosts 102 may access the I/O units 108 and I/O devices 112 concurrently. Furthermore, multiple of the hosts 102 may access a given I/O unit 108 according to the present invention concurrently, supplying overlapping virtual addresses in their host memory 124.

Figure 2:
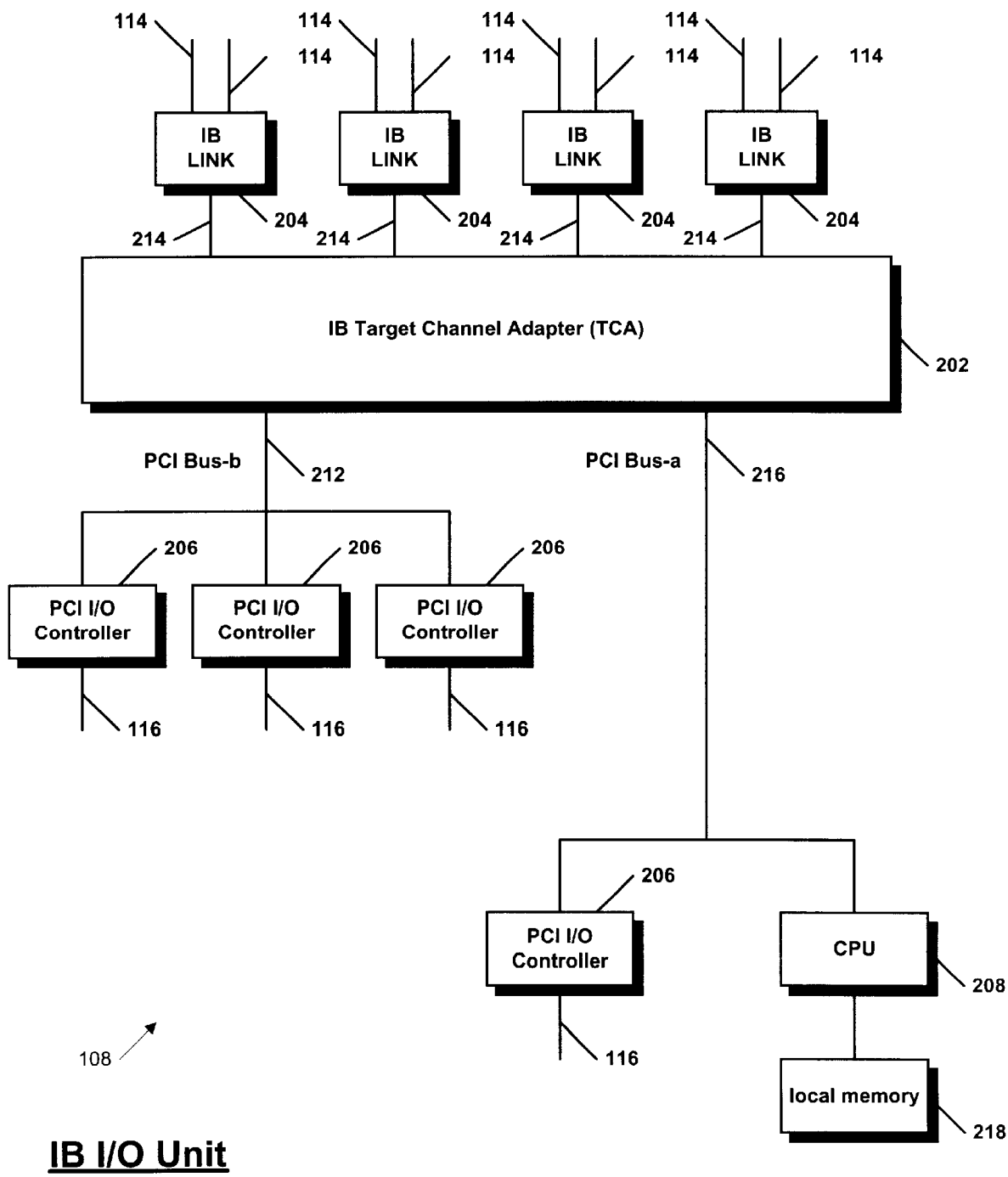
FIG. 2 is a block diagram of an IB I/O unit of FIG. 1 according to the present invention.

Referring to FIG. 2, a block diagram of an IB I/O unit 108 of FIG. 1 according to the present invention is shown. The I/O unit 108 comprises an IB Target Channel Adapter (TCA) 202 coupled to the IB fabric 114 of FIG. 1 by a plurality of IB serialization/deserialization (SERDES) modules 204. An example of the IB SERDES modules 204 is an Agilent HDMP-2634. Preferably, the TCA 202 comprises a single integrated circuit. The IB SERDES modules 204 are coupled to the TCA 202 by 10-bit Low Voltage Differential Signal (LVDS) interfaces 214.

The TCA 202 is also coupled to two PCI buses, referred to as PCI Bus-a 216 and PCI Bus-b 212. Preferably, the PCI buses 212 and 216 are 66 MHz, 64-bit wide PCI buses, thereby being capable of supporting a theoretical maximum bandwidth of 8 Gbps (Gigabits per second) collectively to the TCA 202. However, the present invention is not limited to any particular type of PCI bus, nor to any type of local bus.

A plurality of PCI I/O controllers 206 are coupled to the TCA 202 by the PCI buses 212 and 216. The PCI I/O controllers 206 may be any of various I/O controllers such as PCI SCSI controllers, PCI Ethernet controllers, PCI Fibre-Channel controllers, PCI IEEE 1394 controllers, etc. An example of PCI I/O controller 206 is the Hewlett-Packard Tachyon PCI to Fibre-Channel I/O controller.

Coupled to one of the PCI buses 212 is a local CPU 208, for programming the TCA 202 and I/O controllers 206. Coupled to the CPU 208 is a local memory 218 for storing programs and data for the CPU 208. In addition, the local memory 218 may be used to store data from the I/O controllers 206 in the circumstance where Direct RDMA (DRDMA) operations according to the present invention are not performed. For example, if the I/O unit 108 is a RAID controller performing RAID 5 operations, it may be desirable to buffer the data coming from the disks coupled to the I/O controllers 206 in the local memory 218 in order to perform the necessary exclusive OR operations. However, the present invention seeks to provide a means for avoiding the double buffering of data in the local memory 218, as will be described below.

Figure 3:
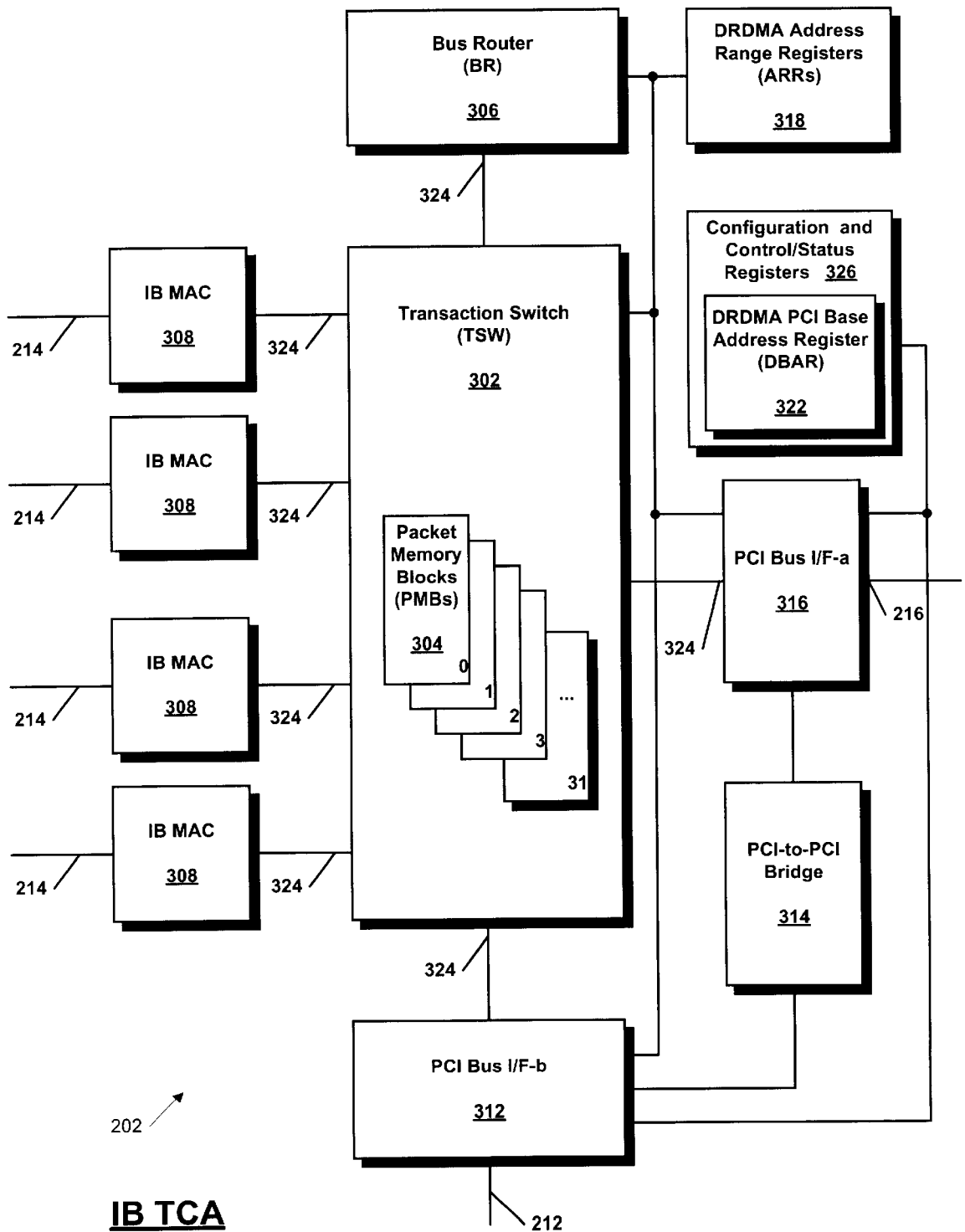
FIG. 3 is a block diagram of the TCA of FIG. 2 according to the present invention.

Referring to FIG. 3, a block diagram of the TCA 202 of FIG. 2 according to the present invention is shown. The TCA 202 comprises a plurality of IB Media Access Controllers (MAC) 308 for coupling the TCA 202 to the IB SERDES modules 204 of FIG. 2. The IB MACs 308 interface the IB physical layer to the TCA 202. The IB MACs 308 perform buffering, packet formatting, flow control, error detection, and other physical and link layer management tasks. The IB MACs 308 perform data transfers between the IB fabric 114 and the TCA 202.

The TCA 202 further includes two PCI interfaces (I/F), referred to as PCI I/F-a 316 and PCI I/F-b 312, for coupling to PCI bus-a 216 and PCI bus-b 212, respectively, of FIG. 2. Preferably, the PCI I/Fs 312 and 316 each include a PCI bus arbiter.

A PCI-to-PCI bridge 314 couples the two PCI I/Fs 312 and 316 together to facilitate data transfers between the two PCI buses 212 and 216. This enables the CPU 208 of FIG. 2 to program the I/O controllers 206 of FIG. 2 on PCI bus-b 212 and the I/O controllers 206 to interrupt the CPU 208. Furthermore, the PCI-to-PCI Bridge 314 enables the I/O controllers 206 to access the local memory 218 of FIG. 2.

The PCI I/Fs 312 and 316 can receive PCI cycles initiated by the I/O controllers 206 or CPU 208 that target the PCI-to-PCI Bridge 314 or TCA 202 base address ranges, specified in configuration and control/status registers 326. One of the configuration registers 326, the DRDMA PCI Base Address Register (DBAR) 322, specifies an address range dedicated to DRDMA operations of the present invention discussed in detail below. A set of DRDMA Address Range Registers (ARR) 318 is used in conjunction with the DBAR 322 to perform DRDMA operations. The ARRs 318 are readable and writeable by a Bus Router 306, PCI I/Fs 312 and 316, Transaction Switch 302, and by the CPU 208 of FIG. 2. The ARRs 318 and their operation are described in detail with respect to FIG. 5 below.

The TCA 202 also includes a Bus Router (BR) 306. The Bus Router 306 performs IB transport layer operations, such as work queue (WQ) processing, memory registration, partition key management, etc. The Bus Router 306 creates IB packet headers for outgoing IB packets and processes inbound IB packet headers. In addition, the Bus Router 306 comprises a DMA (Direct Memory Access) engine for facilitating data transfers between the MACs 308 and the PCI I/Fs 312 and 316.

The TCA 202 also includes a Transaction Switch (TSW) 302. The Transaction Switch 302 directs packets, datagrams and command messages between the MACs 208, the Bus Router 306 and the PCI I/Fs 312 and 316. Preferably, the MACs 208, the Bus Router 306 and the PCI I/Fs 312 and 316 perform transactions with the Transaction Switch 302 via transaction queues 324 that couple the Transaction Switch 302 to each of the functional blocks. The transaction queues 324 comprise input queues and output queues. The Transaction Switch 302 monitors input queues for commands from the functional blocks and submits commands to the functional blocks via output queues.

The Transaction Switch 302 includes a plurality of Packet Memory Blocks (PMB) 304 for storing transaction payload and header data for transfer between the functional blocks. Preferably, the PMBs 304 comprise a multi-ported high speed SRAM. In one embodiment, the Transaction Switch 302 has 32 PMBs 304. However, the present invention is not limited to any particular number of PMBs 304, and the present invention is adaptable to various numbers of PMBs 304 and memory types. The PMBs 304 are described in detail with respect to FIG. 4 and their operation in the present invention is described in detail below. Preferably, the Transaction Switch 302 is capable of simultaneously supporting four 32-bit reads by the MACs 308, four 32-bit writes by the MACs 308, two 64-bit reads or writes from the PCI I/Fs 312 and 316, three 64-bit Bus Router 306 reads and two 64-bit Bus Router 306 writes.

Figures 4, 6:
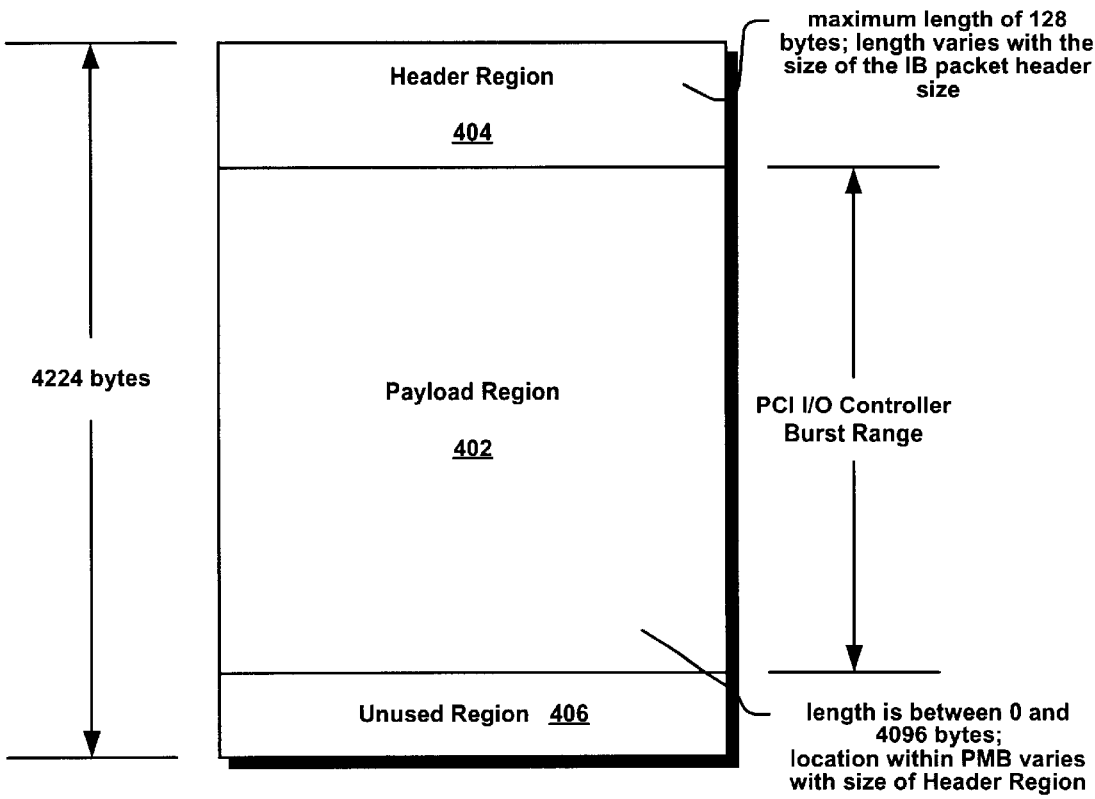
FIG. 4 is a block diagram illustrating the format of a Packet Memory Block of FIG. 3 according to the present invention.
FIG. 6 is a block diagram illustrating the format of an Address Range Register of FIG. 3 according to the present invention.

Referring now to FIG. 4, a block diagram illustrating the format of a Packet Memory Block (PMB) 304 of FIG. 3 according to the present invention is shown. A PMB 304 is 4224 bytes of memory within the Transaction Switch 302. A PMB 304 comprises a header region 404, a payload region 402 and potentially an unused region 406. The sizes of the three regions varies depending upon the type of packet, namely upon the packet header size and the amount of data in the payload.

The header region is at byte offset 0 within the PMB 304. The maximum length of the header region is 128 bytes, which is larger than the maximum IB packet header size. IB packet headers are variable in size depending upon the type of packet and whether the packet will travel through the IB fabric 114 strictly within a subnet or beyond the subnet.

The maximum length of the payload region 402 is 4096 bytes, which is the maximum payload length of an IB packet defined by the Maximum Transfer Unit (MTU) size. However, the present invention is not limited to a particular payload region 402 size, but is adaptable to work with various sizes. The byte offset of the payload region 402 within the PMB 304 is at the end of the header region 404 and varies with the size of the header region 404, i.e., with the size of the packet header. The unused region 406 will be zero length if the packet header is 128 bytes and the packet payload is 4096 bytes.

As a packet comes in from the IB fabric 114 through a MAC 308 into a PMB 304, the packet header is placed by the Transaction Switch 302 into the header region 404 of the PMB 304 and the packet payload is placed by the Transaction Switch 302 into the payload region 402 of the PMB 304.

Conversely, when the TCA 202 desires to transmit a packet on the IB fabric 114, the Bus Router 306 builds a packet header in the header region 404 of the PMB 304 and a MAC 308 pulls the two packet portions from the PMB 304 and transmits it on the IB fabric 114 to its destination node.

In contrast, the PCI I/Fs 312 and 316 burst data in and out of the payload region 402 only of the PMB 304. Advantageously, the TCA 202 employs the PMBs 304 to store and forward data between the MACs 308 and the PCI I/Fs 312 and 316 during DRDMA operations according to the present invention, thereby avoiding double buffering the data in the local memory 218 of FIG. 2.

Figure 5:
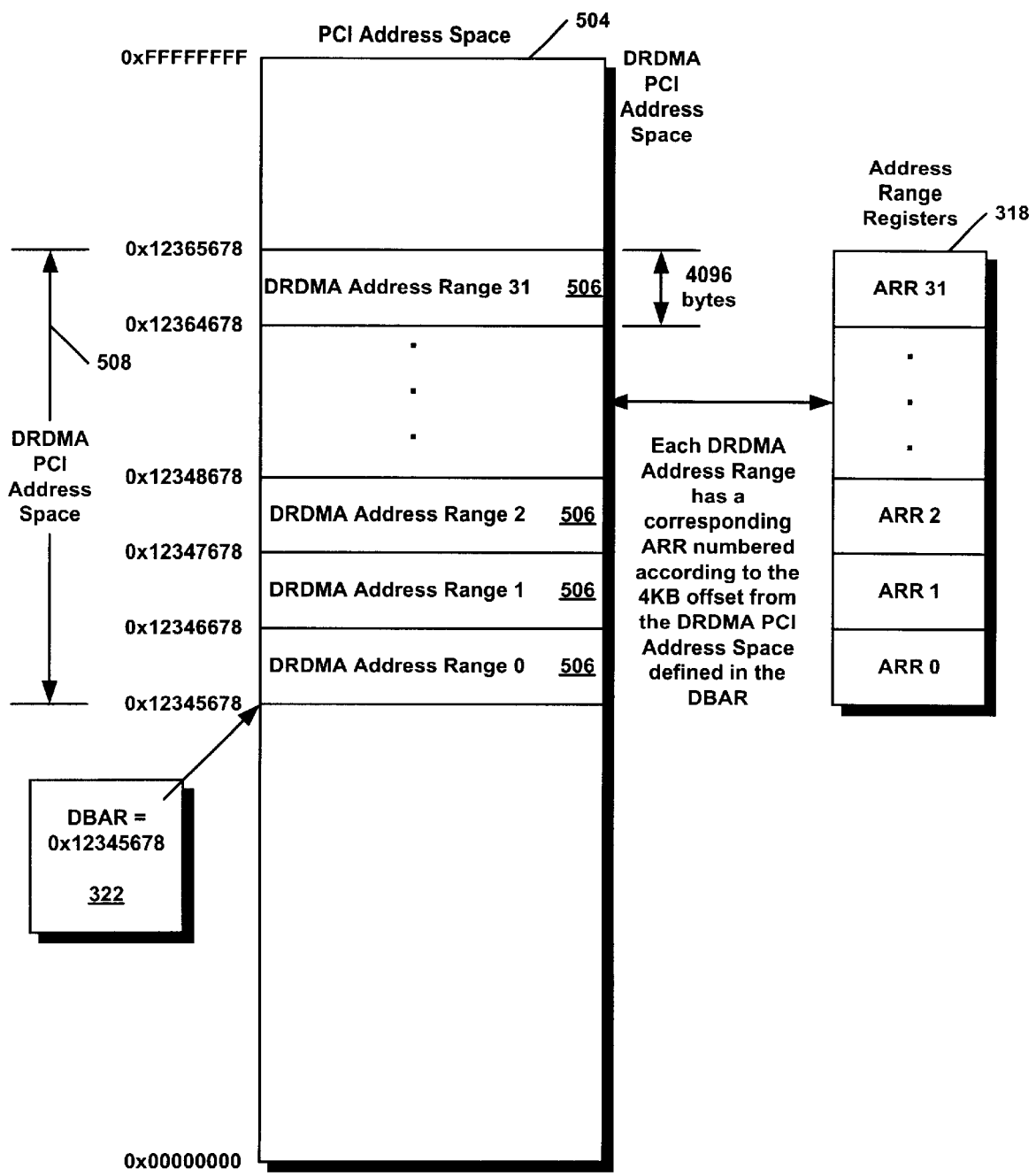
FIG. 5 is a block diagram illustrating a DRDMA Address Range of the present invention within the PCI address space of the PCI buses of FIG. 2.

Referring now to FIG. 5, a block diagram illustrating a DRDMA Address Space 508 of the present invention within the PCI address space 504 of the PCI buses 212 and 216 of FIG. 2 is shown. For exemplary purposes only, the PCI address space 504 is shown as a 32-bit address space, ranging from 0x00000000 to 0xffffffff. In the example of FIG. 5, the DRDMA Base Address Register (DBAR) 322 of FIG. 3 is programmed with a value of 0x12345678 defining the base address of the DRDMA PCI Address Space 508. As shown, the DRDMA PCI Address Space 508 is a contiguous 256 KB address range. Preferably, the DRDMA PCI Address Space 508 is comprised of thirty-two 4096-byte ranges 506 referred to as DRDMA address ranges 0 to 31. For simplicity, an individual DRDMA address range will be referred to as DRDMA address range 506 henceforth. The 4096-byte size of a DRDMA address range 506 is preferable because it advantageously matches the 4096-byte PMB 304 payload region size. However, the present invention is not limited to a particular DRDMA address range 506 size, but is adaptable to work with various sizes.

Thirty-two Address Range Registers (ARRs) 318 of FIG. 3, numbered 0 to 31, correspond to the thirty-two DRDMA address ranges 506 numbered 0 through 31 in the DRDMA PCI Address Space 508. Each DRDMA Address Range 506 has a corresponding ARR 318 numbered according to the 4 KB offset from the DRDMA PCI Address Space 508 defined in the DBAR 322, as shown. The ARRs 318 store information about each of the DRDMA address ranges 506. The ARRs 318 and the relationship between the DRDMA address ranges 506 and the ARRs 318 will now be described with respect to FIG. 6.

Referring now to FIG. 6, a block diagram illustrating the format of an Address Range Register (ARR) 318 of FIG. 3 according to the present invention is shown. For simplicity and clarity, the specification will refer generally to PCI bus-b 212 of FIG. 2 and PCI I/F-b 312 of FIG. 3, rather than PCI bus-a 216 and PCI I/F-a 316. However, the description applies equally to PCI bus-a 216 and PCI I/F-a 316, unless otherwise indicated.

When a PCI initiator on the PCI bus 212, namely one of the I/O controllers 206, initiates a PCI burst cycle, the PCI I/F 312 determines whether the address is within the DRDMA PCI Address Space 508. If so, the PCI I/F 312 examines the ARR 318 corresponding to the individual DRDMA address range 506 within which the PCI burst address resides. If the PCI Valid bit 612 is set and the Type bit 616 in the ARR 318 matches the PCI burst direction, then the PCI I/F 312 will direct the burst to/from a PMB 304, rather than to/from local memory 218 of FIG. 2. The PCI I/F 312 will direct the burst to/from the PMB 304 specified in the Packet Memory Block Number field 608 in the ARR 318.

Using the example ranges of FIG. 5, assume an I/O controller 206 generates a PCI burst write to address 0x12347700. The PCI I/F 312 directs the burst data to the PMB 304 specified in the PMB Number field 608 of ARR 2 318, since the address lies in DRDMA Address Range 2 506. As will be described below, the Bus Router 306 will subsequently create an IB RDMA Write Request packet in the PMB 304 and cause the packet to be transmitted to the host 102 of FIG. 1 that requested the data, thereby performing a Direct RDMA operation, according to the present invention.

The table below provides a description of the various fields in the ARR 318 of FIG. 6. With reference to the table below and throughout the specification, a DRDMA Write is in the direction from PCI to IB and a DRDMA Read is in the direction from IB to PCI.

| Field | Bits | Description |
|---|---|---|
| Total Transfer Length 602 | 12 | The total transfer length of the payload data portions of the Direct RDMA operation. Populated by CPU 208 when allocating this DRDMA Address Range 506. |
| Write Byte Count 604 | 12 | For DRDMA Writes, the current number of bytes accepted by the PCI I/F 312 to this Address Range 506 since this Address Range 506 was allocated. Updated by PCI I/F 312. |
| Read Response Payload Length 606 | 12 | For DRDMA Reads, the RDMA Read Response packet payload length in the specified PMB 304. Populated by Transaction Switch 302. This value is read by the PCI I/F 312 to know how many bytes may be provided to the PCI I/O Controller 206. This will be the MTU value, except for the last or only response packet, which may be less than the MTU. |
| Packet Memory Block Number 608 | 5 | Populated by Transaction Switch 302. Used by PCI I/F 312 to access correct PMB 304. For DRDMA Read, Bus Router 306 populates this field after Transaction Switch 302 notifies Bus Router 306 that RDMA Read Response packet arrives in PMB 304. If multiple Read Response packets are required to satisfy the DRDMA Read, then the Bus Router 306 will update this field when the PCI I/F 312 has finished transferring the current PMB worth of data to the I/O Controller 206. For DRDMA Write, Transaction Switch 302 populates this field when it allocates a PMB 304 in response to allocation of this DRDMA Address Range 506 by CPU 208. |
| PCI Valid 612 | 1 | Indicates the DRDMA Address Range 506 is valid for PCI operations. For DRDMA Read, set by Bus Router 306 and cleared by PCI I/F 312. For DRDMA Write, set by CPU 208 on WQE submission and cleared by PCI I/F 312. |
| BR Valid 614 | 1 | Indicates the DRDMA Address Range 506 is valid for Bus Router 306 operations. For DRDMA Read, set by CPU 208 on WQE submission and cleared by Bus Router 306. For DRDMA Write, set by PCI I/F 312 and cleared by Bus Router 306. |
| Type 616 | 1 | 0 = READ; 1 = WRITE |

Figure 7A:
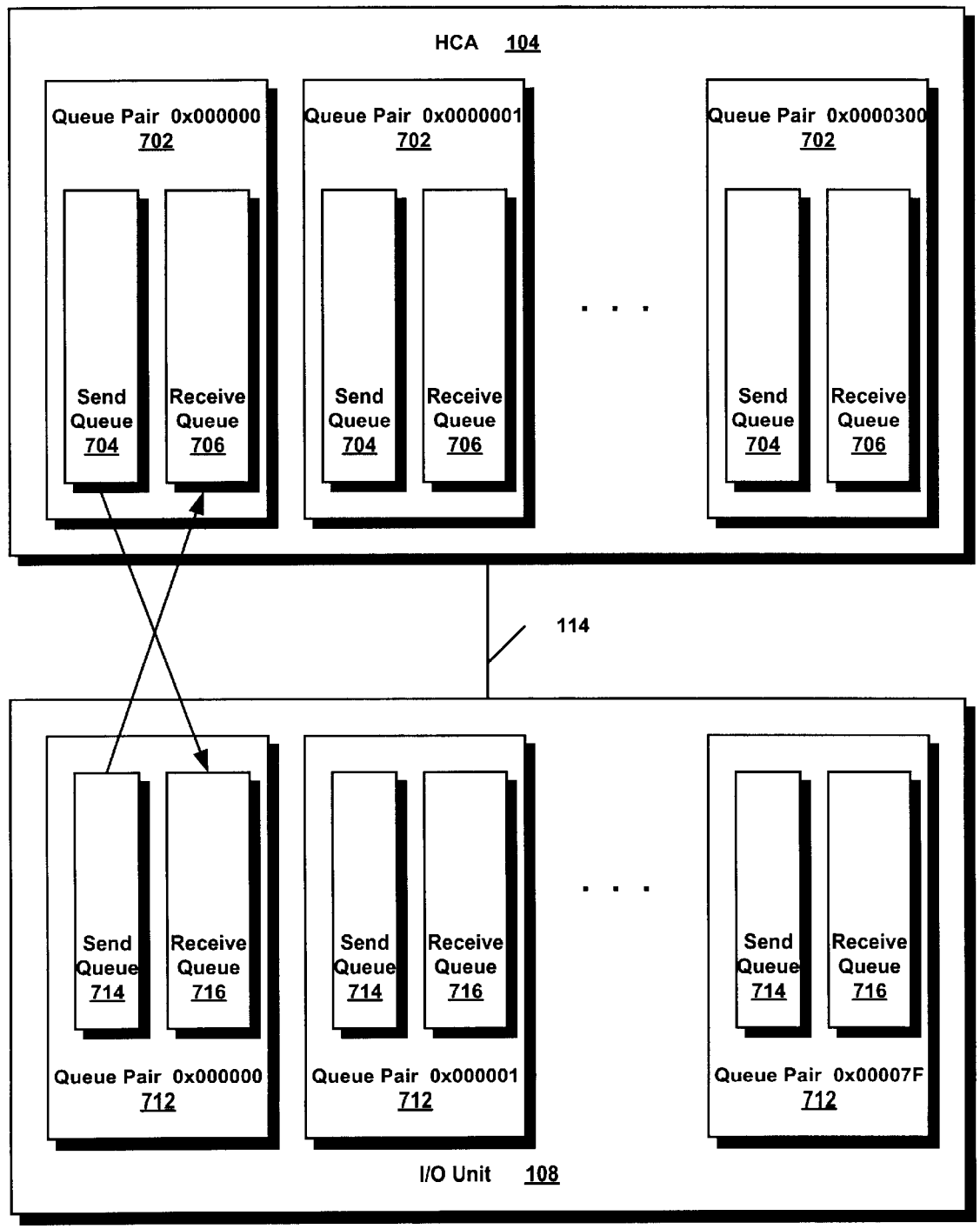
FIG. 7a is a block diagram illustrating IB Queue Pair operation according to the present invention.

Referring now to FIG. 7a, a block diagram illustrating IB Queue Pair (QP) operation according to the present invention is shown. Throughout the description of many of the remaining Figures, reference is made to various IB packet types. The reader is referred forward to FIGS. 10 through 13 for a description of the relevant IB packet types as necessary. FIGS. 10 through 13 are not an exhaustive description of the IB packet fields, but merely describe the fields of major relevance to the present invention. The reader is referred to the IB Architecture Specification for a detailed description of the IB packet fields.

A plurality of QPs 702 exists for HCA 104 of FIG. 1. An HCA 104 QP 702 comprises a Send Queue 704 and a Receive Queue 706. IB QPs have 24-bit QP numbers assigned to them by their channel adapters that uniquely identify them within their channel adapter. In the example in FIG. 7a, QPs 702 with QP Number 0x000000 through 0x00000300 are shown.

Another plurality of QPs 712 exists for I/O unit 108 of FIG. 1. The TCA 202 QPs 712 comprises a Send Queue 714 and a Receive Queue 716. In the example shown in FIG. 7a, QPs 712 have QP Numbers 0x00000000 through 0x0000007F. The QP numbers are used to identify the source and destination QP of a packet for most IB packet types. Preferably, the present invention operates in an IB reliable connection class of service. Consequently, QP 702 0x00000000 and QP 712 0x00000000 are tightly bound to one another as shown.

Figure 7B:
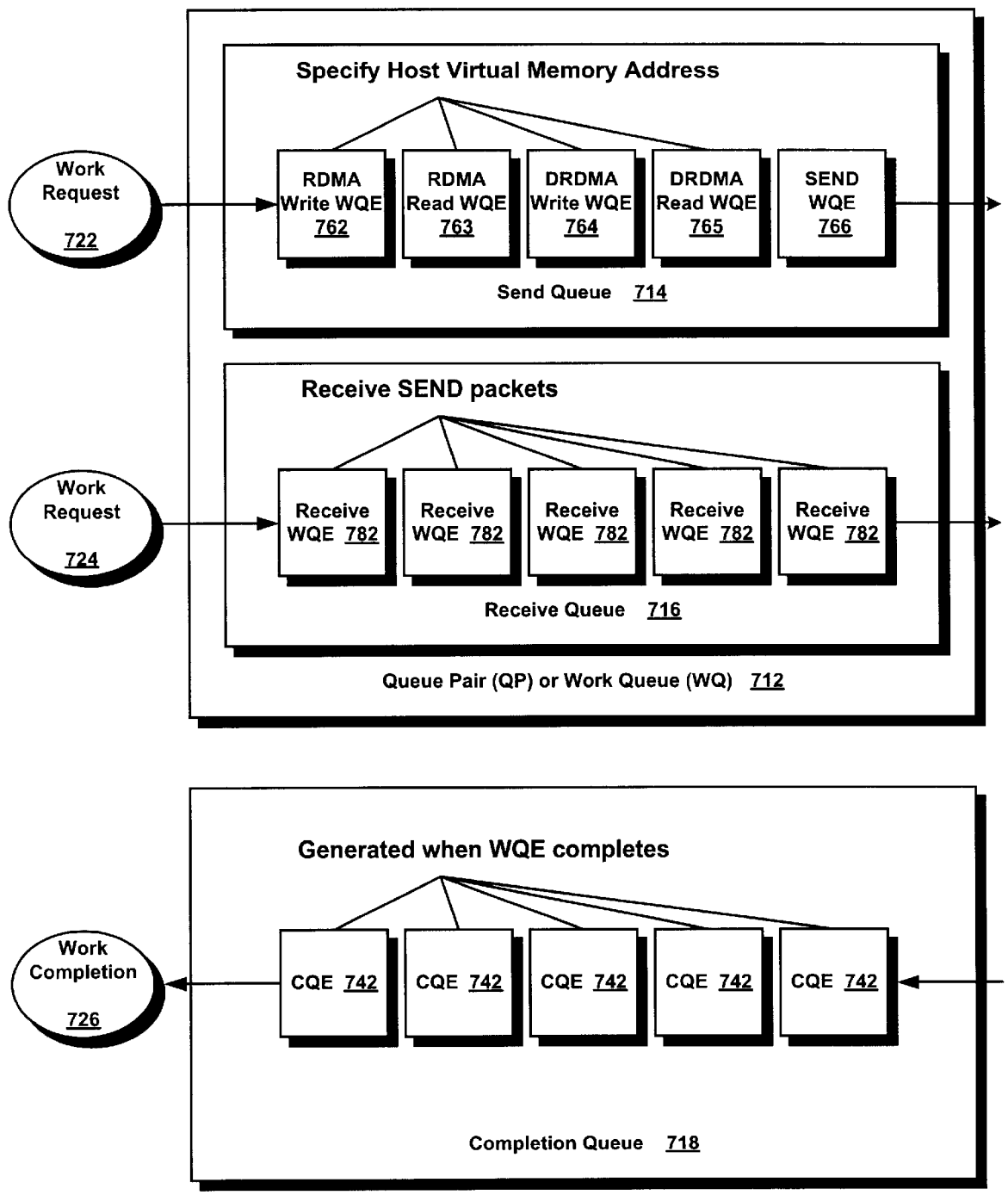
FIG. 7b is a block diagram illustrating in more detail a QP of FIG. 7a and a Completion Queue according to the present invention.

Referring now to FIG. 7b, a block diagram illustrating in more detail a QP 712 of FIG. 7a and a Completion Queue 718 is shown. QP 712 is also referred to as a Work Queue 712. When the CPU 208 of FIG. 2 desires to send the host 102 a message, it submits a work request 722 to the TCA 202 Send Queue 714. The TCA 202 creates a Work Queue Entry (WQE) and places the WQE on the Send Queue 714. Among the WQE types are RDMA Write WQE 762, RDMA Read WQE 763, DRDMA Write WQE 764, DRDMA Read WQE 765, and SEND WQE 766.

The RDMA Write WQE 762, RDMA Read WQE 763, DRDMA Write WQE 764 and DRDMA Read WQE 765 specify, among other things, a virtual address in host 102 memory 124 for data transfers with the I/O unit 108. As the TCA 202 processes the Send Queue 714 WQEs, the TCA 202 generates one or more IB packets for each WQE and transmits the packets to the host 102. Additionally, the TCA 202 may receive in response one or more IB packets from the host 102 in the process of satisfying the WQE.

The Receive Queue 716 includes Receive WQEs 782. Receive WQEs 782 are placed on the Receive Queue 716 when the CPU 208 submits a work request 724 to the TCA 202. Receive WQEs 782 include address fields that point to buffers in the I/O unit 108 local memory 218 of FIG. 2 for receiving the payloads of SEND packets sent by the host 102, among other things.

The WQEs in the WQs 712 of FIGS. 7a and 7b may be associated with IB packets received from or destined for multiple of the IB hosts 102. Furthermore, WQEs in the WQs 712 may be associated with multiple IB packets received from or destined for the same IB host 102. Additionally, the WQEs in the WQs 712 of FIGS. 7a and 7b may include virtual addresses, discussed below with respect to FIGS. 8 and 10 through 13, which overlap with respect to the virtual address space of the IB hosts 102.

The I/O unit 108 also includes a Completion Queue 718 for storing Completion Queue Entries 742. When the TCA 202 has completed a WQE previously placed on the Send Queue 714 by the CPU 208, the TCA 202 creates a CQE 742 and notifies the CPU 208 via a work completion 726.

Referring now to FIG. 8, a block diagram of a WQE 800 according to the present invention is shown. WQE 800 is representative of the WQEs of Work Queue 712 of FIG. 7b. The WQE 800 includes an Operation Type field 802 for specifying the operation, such as a SEND, RDMA Write, RDMA Read, DRDMA Write or DRDMA Read operation. The WQE 800 also includes a Destination QP field 804 for specifying the QP of the HCA 104 to which the packets satisfying the WQE are to be sent.

The WQE 800 also includes a Remote Virtual Address field 806 for specifying the virtual address in host 102 memory 124 to/from which payload data in the packets satisfying the WQE are to be sent/received. Typically, the Remote Virtual Address field 806 will be populated based upon a virtual address sent to the I/O unit 108 in a SEND packet. The WQE 800 also includes a Path MTU field 808 for specifying the maximum packet payload size on the IB path between the HCA 104 and the I/O unit 108. If the total data transfer length to be sent to the host 102 is greater than the Path MTU field 808 value, the TCA 202 will send multiple packets of data to satisfy the WQE request.

The WQE 800 also includes a SGL local address field 812 for specifying the physical address in local memory 218 of a scatter/gather list (SGL), described below with respect to FIG. 9. The WQE 800 also includes a nextResponse field 814 for pointing to the next WQE 800 in a Work Queue Response List, discussed below with respect to FIG. 23. The WQE 800 also includes other fields 816 for specifying information necessary for the CPU 208 to request a transaction from the TCA 202, such as R_Key, partition keys, source local ID, destination local ID, destination global ID, service level, port number, etc.

Referring now to FIG. 9, a block diagram of a SGL 900 according to the present invention is shown. The SGL 900 may be viewed conceptually as a portion of the WQE 800. The SGL 900 includes a plurality of local address fields 912 to 918 for specifying addresses on the PCI buses 212 and 216 of FIG. 2. If a Direct field 902 of the SGL 900 is set, then the local address fields specify whether an RDMA operation should be a direct RDMA according to the present invention, or whether the RDMA should be a double buffering RDMA according to the conventional approach. The CPU 208 creates the SGLs 900 in conjunction with the WQEs 800 in response to messages received from the host 102, such as I/O read or write commands.

In the conventional approach, a local address 912 specifies a PCI address in the range corresponding to local memory 218. In the DRDMA approach, a local address 912 specifies a PCI address in the DRDMA Address Space 508 of FIG. 5. In the DRDMA approach, the PCI data will be directed to/from a PMB 304 of FIG. 3 specified by the PMB Number field 608 of FIG. 6 in an ARR 318 of FIG. 5 specified by an ARR Number field 904 in the SGL 900.

Each local address field 912 to 918 has a corresponding local length field 922 to 928 for specifying the number of bytes of data to be transferred at the corresponding local address 912 to 918. The SGL 900 also includes a total length 906 field for specifying the total number of bytes requested to be transferred by the WQE 800 that points to the SGL 900. The SGL 900 also includes other fields 908 for specifying information necessary for the CPU 208 to request a transaction from the TCA 202, such as the I/O controller 206 number, hop limit, operation type, acknowledge requested, immediate data present, immediate data, interrupt after completion, R_Key, etc.

Figure 10:
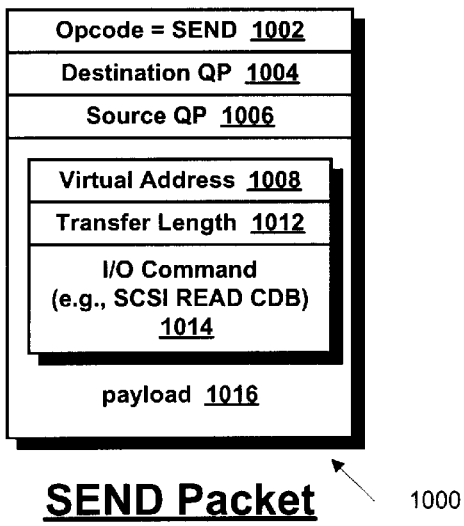
FIG. 10 is a block diagram of an IB SEND packet.

Referring now to FIG. 10, a block diagram of an IB SEND packet 1000 is shown. The SEND packet 1000 includes an opcode field 1002 for specifying that the packet is a SEND type. The SEND packet 1000 also includes a Destination QP field 1004 for specifying the QP number on the IB destination node. The SEND packet 1000 also includes a Source QP field 1006 for specifying the QP number on the IB sending node.

The SEND packet 1000 also includes a payload field 1016 for storing the data to be transmitted to the IB destination node. The payload field 1016 typically includes a virtual address field 1008 for specifying a virtual address in the memory of the destination node, such as in memory 124 of the host 102 or of the local memory 218 of the I/O unit 108. The virtual address 1008 is typically the location in the memory of the SEND packet sender, also referred to as an IB Requester. The payload field 1016 also typically includes a transfer length 1012 for specifying the number of bytes to be transferred to/from the virtual address 1008.

The payload field 1016 also typically includes an I/O Command 1014 for instructing the I/O unit 108 to transfer data to/from an I/O Device 112 of FIG. 1. An example of an I/O Command 1014 is a SCSI READ CDB for specifying a disk drive number, starting sector and sector count to read from the specified SCSI disk drive. The payload field 1016 of the SEND packet 1000 specifying an I/O operation, such as a SCSI operation, is commonly referred to as an "out-of-band" transaction.

Figure 11:
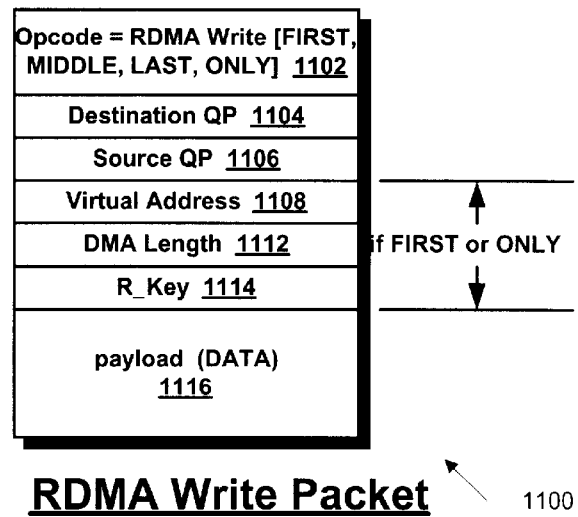
FIG. 11 is a block diagram of an IB RDMA Write packet.

Referring now to FIG. 11, a block diagram of an IB RDMA Write packet 1100 is shown. The RDMA Write packet 1100 includes an opcode field 1102 for specifying that the packet is an RDMA Write type. RDMA Write packets are used to transfer a payload of data from the source IB node of the packet to a virtual address in the memory of the destination IB node of the packet.

The RDMA Write packet 1100 also includes a Destination QP field 1104, Source QP field 1106, and Virtual Address field 1108 similar to those of the SEND packet 1000 described above. The RDMA Write packet 1100 also includes a DMA Length 1112 field for specifying the number of bytes to transfer between the source and destination nodes.

The RDMA Write packet 1100 also includes an R_Key field 1114 for specifying a remote key value used with the virtual address field 1108 to describe authorization for the remote access to the memory of the destination node. Finally, the RDMA Write packet 1100 also includes a payload field 1116 for storing the data to be transferred to the destination node.

An RDMA Write packet 1100 may be a FIRST, MIDDLE, LAST or ONLY type RDMA Write packet. The virtual address 1108, DMA length 1112 and R_Key fields 1114 are only specified in the FIRST or ONLY type RDMA Write packets.

Figure 12:
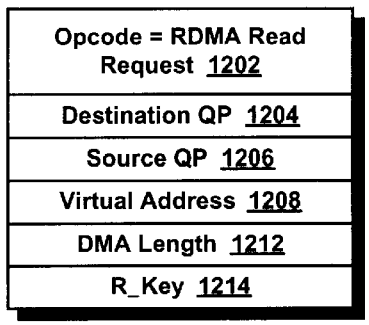
FIG. 12 is a block diagram of an IB RDMA Read Request packet.

Referring now to FIG. 12, a block diagram of an IB RDMA Read Request packet 1200 is shown. The RDMA Read Request packet 1200 includes an opcode field 1202 for specifying that the packet is an RDMA Read Request type. RDMA Read Request packets are used to request the destination IB node of the packet to transfer one or more payloads of data from a virtual address in the memory of the destination node to the source node of the packet.

The RDMA Read Request packet 1200 also includes a Destination QP field 1204, Source QP field 1206, Virtual Address field 1208, DMA Length 1212 field and R_Key field 1214 similar to those of the RDMA Write packet 1100 described above.

Figure 13:
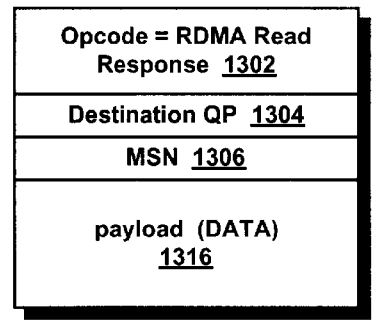
FIG. 13 is a block diagram of an IB RDMA Read Response packet.

Referring now to FIG. 13, a block diagram of an IB RDMA Read Response packet 1300 is shown. The RDMA Read Response packet 1300 includes an opcode field 1302 for specifying that the packet is an RDMA Read Response type. RDMA Read Response packets are used to transfer a payload of data from a virtual address in the memory of the source IB node of the packet to the destination IB node of the packet in response to an RDMA Read Request packet 1200 sent previously by the destination node to the source node.

The RDMA Read Response packet 1300 also includes a Destination QP field 1304 similar to that of the RDMA Write packet 1100 described above. The RDMA Read Response packet 1300 also includes a MSN (Message Sequence Number) field 1306 for specifying a monotonically increasing sequence number of the last message completed at the responder. Finally, the RDMA Read Response packet 1300 includes a payload field 1316 for storing the data to be transferred to the destination node.

Figure 14:
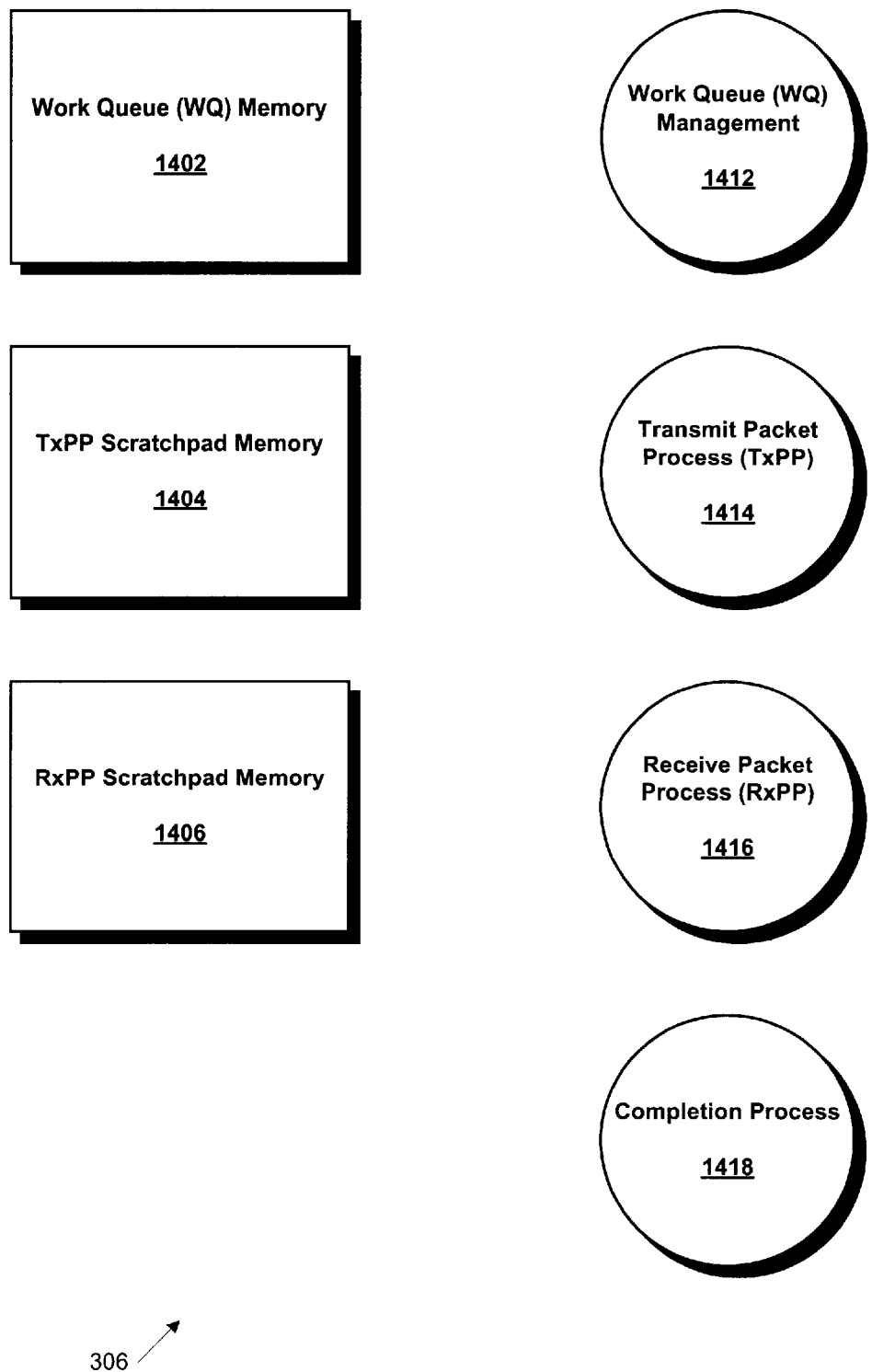
FIG. 14 is a block diagram illustrating portions of the Bus Router of FIG. 3 according to the present invention.

Referring now to FIG. 14, a block diagram illustrating portions of the Bus Router 306 of FIG. 3 according to the present invention is shown. The Bus Router 306 includes Work Queue Management logic 1412 for processing the Work Queues 712 of FIG. 7b. The Work Queue Management logic 1412 is responsible for processing Work Requests 722 of FIG. 7b submitted by the CPU 208 of FIG. 2. Preferably, the Work Queues 712 reside in the local memory 218 of FIG. 2. The Work Queue Management logic 1412 utilizes a WQ memory 1402 inside the Bus Router 306 to locally process the Work Queue 712 WQE 800 of FIG. 8 more efficiently.

The Bus Router 306 also includes Transmit Packet Process (TxPP) logic 1414 for creating IB packets such as those of FIGS. 10 to 13 in one or more PMBs 304 of FIG. 3 for transmission to an IB destination node, such as host 102 of FIG. 1. The TxPP logic 1414 utilizes SGLs 900 of FIG. 9 to generate the transmit packets from data at local addresses on the PCI buses 212 and 216 of FIG. 2. If the transmitted packet is an RDMA Write packet 1100 of FIG. 11 associated with a DRDMA Write operation, then the local PCI addresses will be specified in the DRDMA Address Space 508 of FIG. 5. Preferably, the SGLs 900 reside in the local memory 218 of FIG. 2. The TxPP logic 1414 utilizes a TxPP Scratchpad memory 1404 inside the Bus Router 306 to locally process the SGLs 900 more efficiently. The TxPP logic 1414 is responsible for generating multiple IB packets for transmission of the data specified in the SGL 900 if necessary. The TxPP logic 1414 notifies the Transaction Switch 302 of FIG. 3 when a packet is ready for transmission by a MAC 308 of FIG. 3.

The Bus Router 306 also includes Receive Packet Process (RxPP) logic 1416 for processing incoming IB packets such as those of FIGS. 10 to 13 received from an IB source node, such as host 102 of FIG. 1. The RxPP logic 1416 also utilizes SGLs 900 of FIG. 9 to transfer data in a received packet to local addresses on the PCI buses 212 and 216. If the received packet is an RDMA Read Response packet 1300 of FIG. 13 associated with a DRDMA Read operation, then the local PCI addresses will be specified in the DRDMA Address Space 508 of FIG. 5. The RxPP logic 1416 utilizes a RxPP Scratchpad memory 1406 inside the Bus Router 306 to locally process the SGLs 900 more efficiently. Preferably, the scratchpad memories 1404 and 1406 are used by the Bus Router 306 for an operation currently being processed by the Bus Router 306.

The RxPP logic 1416 receives a notification from the Transaction Switch 302 when a packet is received by a MAC 308 into a PMB 304. The RxPP logic 1416 makes the association between an incoming IB packet and the appropriate one of the many TCA 202 QPs 712. The RxPP logic 1416 also determines if packets are missing in a sequence.

If the received packet is an RDMA Read Request packet 1200, then no data is transferred by the RxPP logic 1416. Instead, the RxPP logic 1416 forwards the received packet to the TxPP logic 1414 for creation of an outgoing RDMA Read Response packet 1300.

The Bus Router 306 also includes Completion Process logic 1418 for maintaining the Completion Queues 718 of FIG. 7b. The Completion Process logic 1418 takes completed WQEs 800 and SGLs 900 from the TxPP logic 1414 or RxPP logic 1416, associates them with a completion queue 718, and notifies CPU 208 of the completion.

Figure 15:
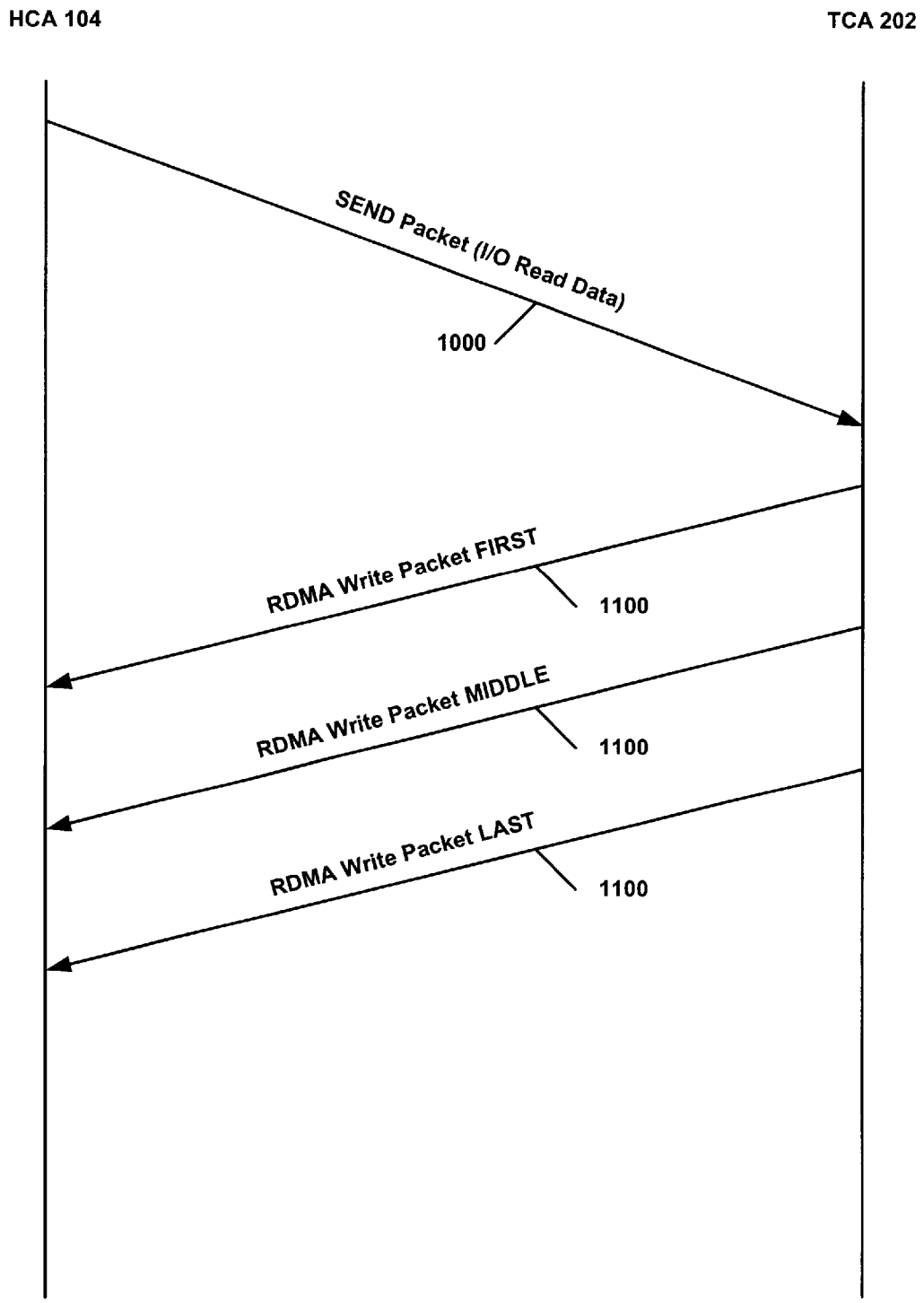
FIG. 15 is a ladder diagram illustrating an I/O read operation according to the present invention.

Referring now to FIG. 15, a ladder diagram illustrating an I/O read operation according to the present invention is shown. First, an HCA 104 of FIG. 1 transmits a SEND packet 1000 of FIG. 10 to a TCA 202 of FIG. 2 specifying an I/O read data operation, such as a SCSI READ CDB. In the example of FIG. 15, the amount of data requested is greater than the amount that can be transmitted in two IB packets. Therefore, the TCA 202 transmits three RDMA Write packets 1100 of FIG. 11: a FIRST, MIDDLE and LAST RDMA Write packet 1100, respectively. The data requested in the SEND packet 1000 is returned by the TCA 202 in the payloads of the RDMA Write packets 1100.

Figure 16:
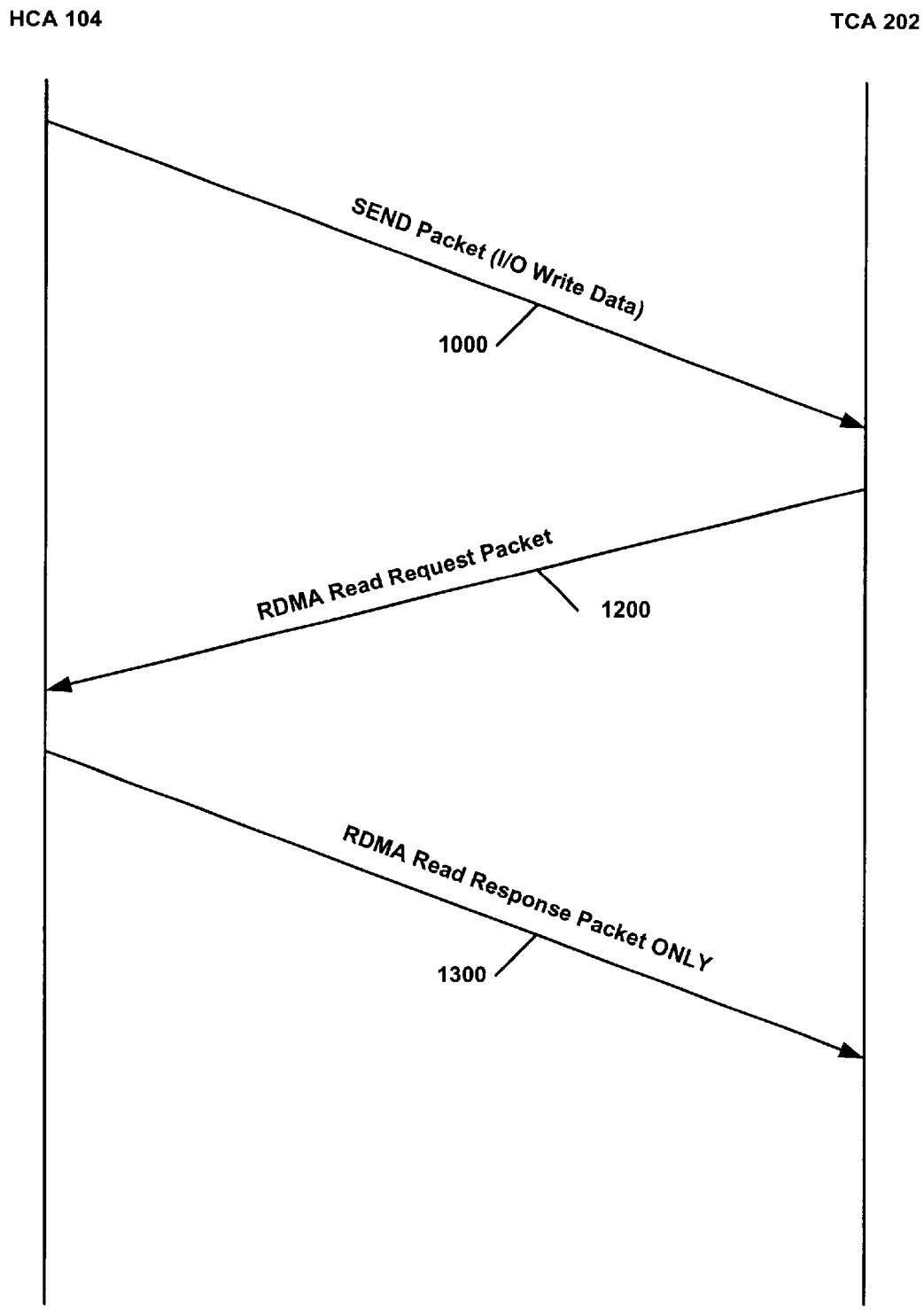
FIG. 16 is a ladder diagram illustrating an I/O write operation according to the present invention.

Referring now to FIG. 16, a ladder diagram illustrating an I/O write operation according to the present invention is shown. First, an HCA 104 of FIG. 1 transmits a SEND packet 1000 of FIG. 10 to a TCA 202 of FIG. 2 specifying an I/O write data operation, such as a SCSI WRITE CDB. In response to the SEND packet 1000, the TCA 202 sends an RDMA Read Request Packet 1200 of FIG. 1200 to the HCA 104 requesting the HCA 104 to transmit the specified data. In the example of FIG. 16, the amount of data requested is an amount that can be transmitted in a single IB packet. Therefore, the HCA 104 transmits one RDMA Read Response ONLY packet 1300 of FIG. 13. The data requested in the RDMA Read Request packet 1200 is returned by the HCA 104 in the payload of the RDMA Read Response packet 1300.

Referring now to FIG. 17, a flowchart illustrating steps in initialization of the TCA 202 of FIG. 2 related to Direct RDMA operation according to the present invention is shown. After a reset of the TCA 202, the CPU 208 of FIG. 2 requests the TCA 202 to dedicate a fixed number of PMBs 304 of FIG. 3 for DRDMA operations, in step 1702. In response, the Transaction Switch 302 allocates the requested number of PMBs 304, in step 1704. As a result of step 1704, the DRDMA-dedicated PMBs 304 are no longer available for use by the MACs 308 for receiving incoming IB packets.

The CPU 208 stores the fixed number of DRDMA-dedicated PMBs 304 that were allocated in step 1704 in a variable, num_DRDMA_PMBs 1732, in step 1706. The CPU 208 also initializes another variable allocated_DRDMA_PMBs 1734 to a value of 0 to indicate that none of the DRDMA-dedicated PMBs 304 have been allocated yet for DRDMA operations. The CPU 208 uses these two variables to determine if a DRDMA-dedicated PMB 304 is available, as will be discussed with respect to FIG. 18a.

Additionally, the CPU creates a free list of DRDMA Address Ranges 1742, as shown, in step 1706. The free list elements includes numbers corresponding to the DRDMA Address Ranges 506 of FIG. 5, i.e., DRDMA Address Ranges 0 through 31.

Next, the CPU 208 programs the DRDMA Base Address Register (DBAR) 322 of FIG. 3 with a base address value and range length value, in step 1708. The base address value and length programmed into the DBAR 322 defines the DRDMA Address Space 508 of FIG. 5 in the PCI Address Space 504.

Figure 18A:
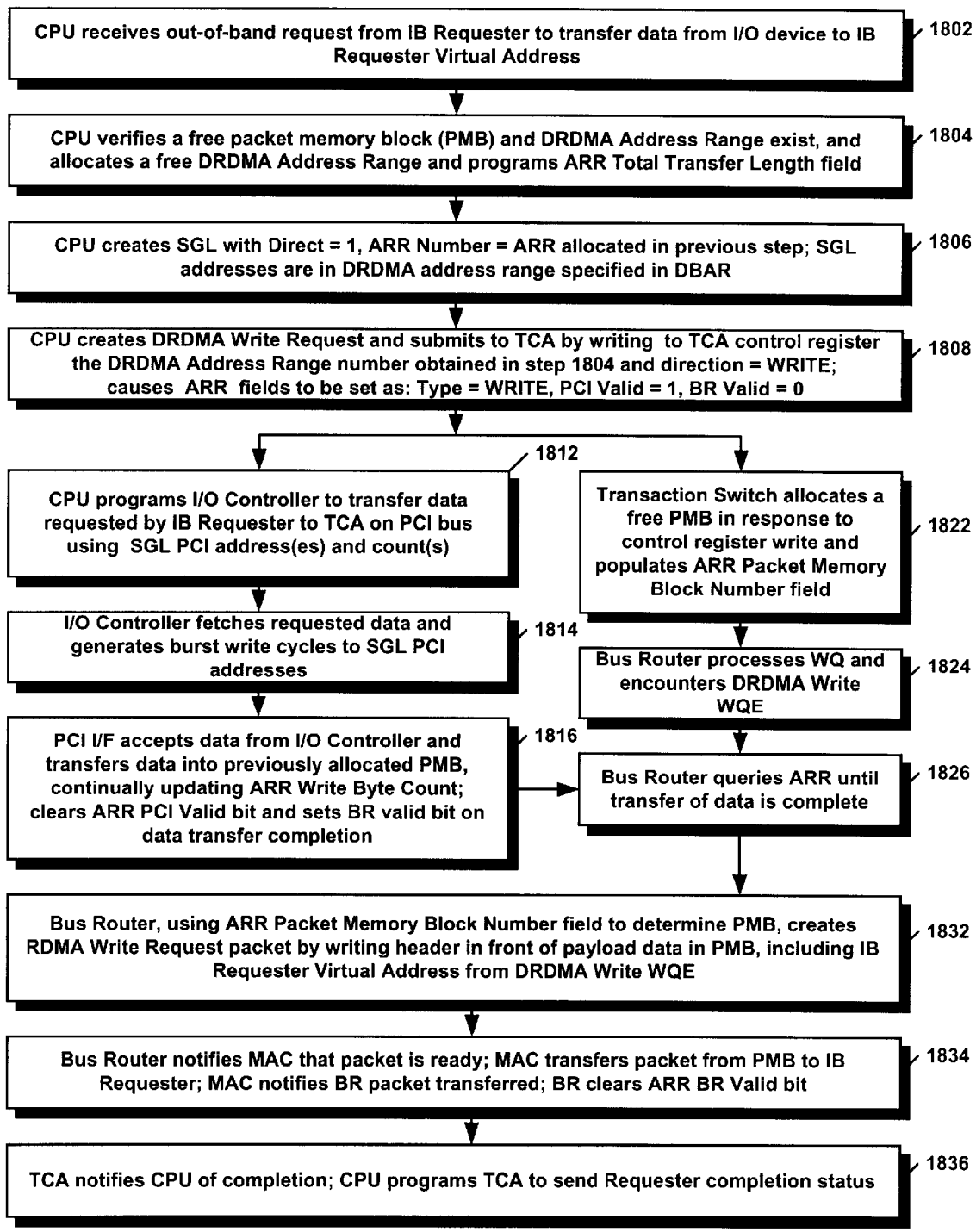
FIG. 18a is a flowchart illustrating a Direct RDMA Write operation according to the present invention.

Referring now to FIG. 18a, a flowchart illustrating a Direct RDMA Write operation according to the present invention is shown. FIG. 18a illustrates a DRDMA Write operation in the context of an I/O Read operation such as the I/O Read operation described in FIG. 15. The I/O Read operation described in FIG. 15 could be performed according to the conventional double buffering method by buffering data from an I/O controller 206 in an intermediate fashion in the local memory 218 and then having the TCA 202 transfer the data from the local memory 218 to the host 102. However, it is the purpose of the Direct RDMA Write operation according to the present invention to avoid buffering the data in the local memory 218 thereby making more efficient use of the bandwidth of the PCI buses 212 and 216 and local memory 218 bandwidth as will be described now.

First, the CPU 208 of FIG. 2 is notified by the TCA 202 of FIG. 2 of the reception from an IB Requester, such as host 102 of FIG. 1, of an out-of-band I/O read request, such as the SEND packet 1000 of FIG. 15, in step 1802. The SEND packet 1000 includes a virtual address 1008 of FIG. 10 specifying a location in host 102 memory 124 to which the TCA 202 is to transfer data specified in the I/O Command field 1014 from one of the I/O devices 112 specified in the I/O Command field 1014. The SEND packet 1000 specifies the source QP 1006 of the HCA 104 in the host 102 that transmitted the SEND packet 1000 and specifies the destination QP 1004 of the TCA 202 that received the SEND packet 1000.

In response to the I/O read request, the CPU 208 verifies that a free PMB 304 of FIG. 3 that was dedicated to DRDMA operations in step 1704 of FIG. 17 exists, in step 1804. The CPU 208 determines whether a free DRDMA-dedicated PMBs 304 exists by comparing the num_DRDMA_PMBs variable 1732 of FIG. 17 with the allocated_DRDMA_PMBs variable 1734. The CPU 208 does not know which of the DRDMA-dedicated PMBs 304 exists, but rather only that one exists. The CPU 208 increments the allocated_DRDMA_PMBs variable 1734 when it allocates a DRDMA-dedicated PMB 304 and decrements the variable when it deallocates a DRDMA-dedicated PMB 304. If all of the DRDMA-dedicated PMBs 304 are currently allocated to other DRDMA operations, then the CPU 208 must either wait until a DRDMA-dedicated PMB 304 becomes available or process the I/O read operation as a conventional double buffered I/O operation.

In addition, the CPU 208 verifies that at least one of the DRDMA Address Ranges 506 is free by examining the DRDMA Address Range Free List 1742, in step 1804. The CPU 208 then programs an ARR 318 of FIG. 5 corresponding to the ARR number returned from the free list 1742 element. The CPU 208 programs the ARR 318 Total Transfer Length field 602 with the number of data bytes to be transferred in the I/O read operation specified in the Transfer Length field 1012 of the SEND packet 1000 of FIG. 10 that was received in step 1802, in step 1804.

In one embodiment, if the size of the Transfer Length field 1012 is greater than the maximum size of the PMB 304 payload region 402 of FIG. 4, then the CPU 208 programs the TCA 202 to perform multiple DRDMA operations. That is, steps 1804 through 1834 are performed multiple times until all the data requested by the host 102 has been transferred. In one embodiment, the CPU 208 verifies that multiple free PMBs 304 and ARRs 318 exist and allocates and programs the multiple ARRs 318, in step 1804.

The CPU 208 creates a SGL 900 of FIG. 9, in step 1806. In particular, the CPU 208 sets the Direct bit 902 to indicate that the operation is to be a Direct RDMA operation rather than a conventional, i.e., double buffered, RDMA operation. Additionally, the CPU 208 writes the Address Range 506 number obtained during step 1804 into the Address Range Register field 904 of the SGL 900, in step 1806. The CPU

208 populates the Total Length field 906 with number of data bytes specified in the Transfer Length field 1012 of the original SEND packet 1000.

Further, the CPU 208 populates the Local Address 0 field 912 and Local Length 0 field 922 of the SGL 900, in step 1806. The CPU 208 populates the Local Address 0 field 912 with an address in the DRDMA Address Range 506 allocated during step 1804. That is, the CPU 208 populates the Local Address 0 field 912 with the sum of the value in the DBAR register 322 and the product of the ARR 318 Number and the DRDMA Address Range 506 size (which is 4096 bytes in the example of FIG. 5). Thus, in the example of FIG. 5, if the DRDMA Address Range 506 is Address Range 2, then the Local Address 0 field would be populated with the value 0x12345678+(0x1000*2), or 0x12347678. The CPU 208 populates the Local Length 0 field 922 with the same value as the Total Length field 906. In one embodiment, the CPU 208 creates a SGL 900 for multiple I/O controllers 206 to transfer data to the TCA 202, such as in a RAID controller, as discussed with respect to FIG. 18*b*.

Next, the CPU 208 creates a DRDMA Write WQE 800 of FIG. 8 and submits it to the TCA 202, in step 1808. The CPU 208 populates the Operation Type field 802 with a value indicating a DRDMA Write operation. The CPU 208 populates the Destination QP field 804 with the QP of the HCA 104 that sent the I/O read request that was received during step 1802, i.e., the source QP field 1006 of the SEND packet 1000 of FIG. 10. The CPU 208 populates the Remote Virtual Address field 806 with the value of the Virtual Address field 1008 that was received in the SEND packet 1000 during step 1802. The CPU 208 populates the SGL local address 812 field with the PCI physical address of the SGL 900 that was created during step 1806.

After the CPU 208 creates the WQE 800, the CPU 208 submits the WQE 800 to the TCA 202 by writing to a control register in the control/status registers 326 of FIG. 3, in step 1808. The CPU 208 writes the DRDMA Address Range 506 Number obtained in step 1804 to the TCA 202 and indicates the direction is a DRDMA WRITE, i.e. from PCI 212 to the TCA 202, in step 1808.

The write by the CPU 208 of the control register 326 during step 1808 sets the ARR 318 Type bit 616 to indicate a WRITE, i.e., write from PCI I/O controller 206 to PMB 304. The CPU 208 write also sets the ARR 318 PCI Valid bit 612 to indicate the PCI Address Range 506 corresponding to the ARR 318 is valid for PCI I/F 312 operations. That is, the PCI I/F 312 is now authorized to accept PCI burst write operations in the corresponding DRDMA Address Range 506 from the I/O Controller 206 and transfer data into the PMB 304 specified in the ARR 318. The CPU 208 write also clears the ARR 318 BR Valid bit 614 to indicate the PCI Address Range 506 corresponding to the ARR 318 is invalid for Bus Router 306 operations. That is, the Bus Router 306 cannot yet direct a transfer data from the PMB 304 specified in the ARR 318 to a MAC 308 because the data has not yet arrived in the PMB 304 from the PCI bus 212.

After the CPU 208 submits the WQE 800 to the TCA 202, the CPU 208 programs the I/O Controller 206 to fetch data from the I/O device 112 specified in the I/O read request received during step 1802, in step 1812. The CPU 208 provides the I/O controller 206 with the SGL 900 created during step 1806, or equivalent thereof, to instruct the I/O controller 206 to burst the data fetched from the I/O device 112 to the PCI addresses in the DRDMA Address Space 508 specified in the SGL 900. In one embodiment, the CPU 208 programs multiple I/O controllers 206 to transfer data to the TCA 202 from multiple I/O devices 112.

In response, the I/O controller 206 fetches the specified data from the I/O device 112, and generates PCI burst write cycles on the PCI bus 212 to the PCI addresses specified in the SGL 900, in step 1814.

The PCI I/F 312 detects the PCI burst write cycles generated by the I/O controller 206 during step 1814 and determines that the PCI burst addresses are in the DRDMA Address Space 508 based on the DBAR 322 programmed during step 1708, in step 1816. The PCI I/F 312 determines which of the particular DRDMA Address Ranges 506 the PCI burst address is directed toward according to the method shown in FIG. 19*a*.

Figure 19A:
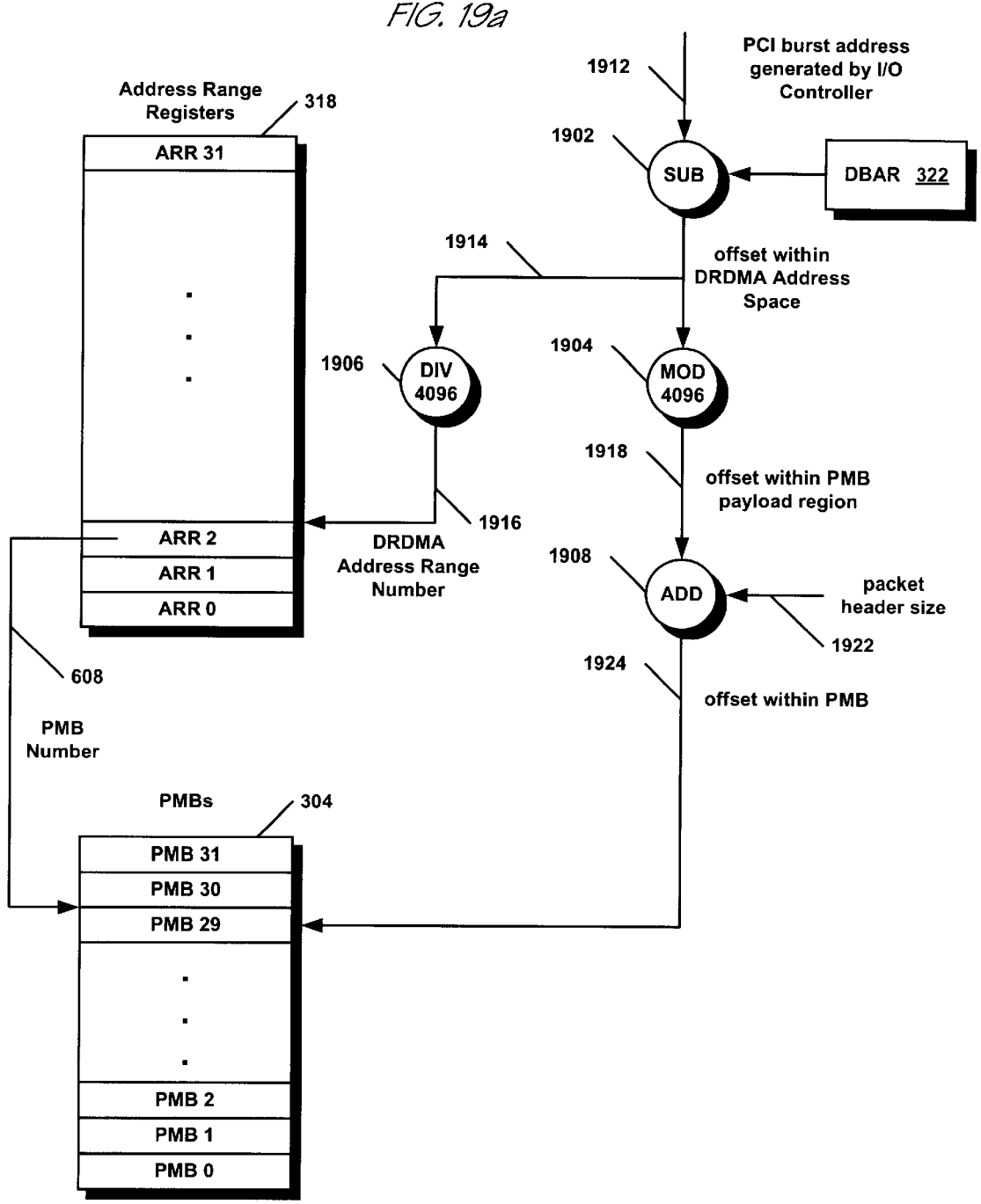
FIG. 19a is a block diagram illustrating PCI Bus burst address translation according to the present invention.

Referring now to FIG. 19*a*, a block diagram illustrating PCI Bus 212 or 216 burst address translation according to the present invention is shown. The I/O controller 206 generates a PCI burst address 1912 that is received by PCI I/F 312. Subtraction logic 1902 within the PCI I/F 312 subtracts the DRDMA Address Range base address stored in the DBAR 322 from the burst address 1912 to produce an offset 1914 within the DRDMA Address Space 508 of FIG. 5. The DRDMA Address Space 508 offset 1914 is divided by division logic 1906 by the size of a DRDMA Address Range 506, shown by example as 4096 bytes in FIG. 19*a*, to produce a DRDMA Address Range Number 1916 corresponding to one of the DRDMA Address Ranges 506 of FIG. 5. The ARR 318 PMB Number field 604 points to the correct PMB 304, as shown.

In addition, modulo logic 1904 performs a modulo operation on the DRDMA address range offset 1914 by the maximum size of a PMB payload region 402 of FIG. 4, shown by example as 4096 bytes in FIG. 19*a*, to produce an offset 1918 within a PMB payload region 402. Adder logic 1908 adds to the payload region offset 1918 a packet header size 1922 to produce the offset within the PMB 304 to which the PCI I/F 312 is to write the burst data received from the I/O controller 206.

In the case of an outgoing RDMA Write packet 1100 associated with a DRDMA Write operation, the CPU 208 knows at the time it submits the DRDMA Write request to the TCA 202 during step 1808 of FIG. 18*a* what the size of the RDMA Write packet 1100 will be and supplies the packet header size to the TCA 202. The Transaction Switch 302 provides the packet header size 1922 to the adder logic 1908 based on the information supplied by the CPU 208. In the case of an incoming RDMA Read Response packet 1300 associated with a DRDMA Read operation, discussed below with respect to FIG. 22*a*, the Bus Router 306 supplies the packet header size 1922 to the adder logic 1908 after reading the packet header size included in the incoming RDMA Read Response packet 1300 header.

Figure 19B:
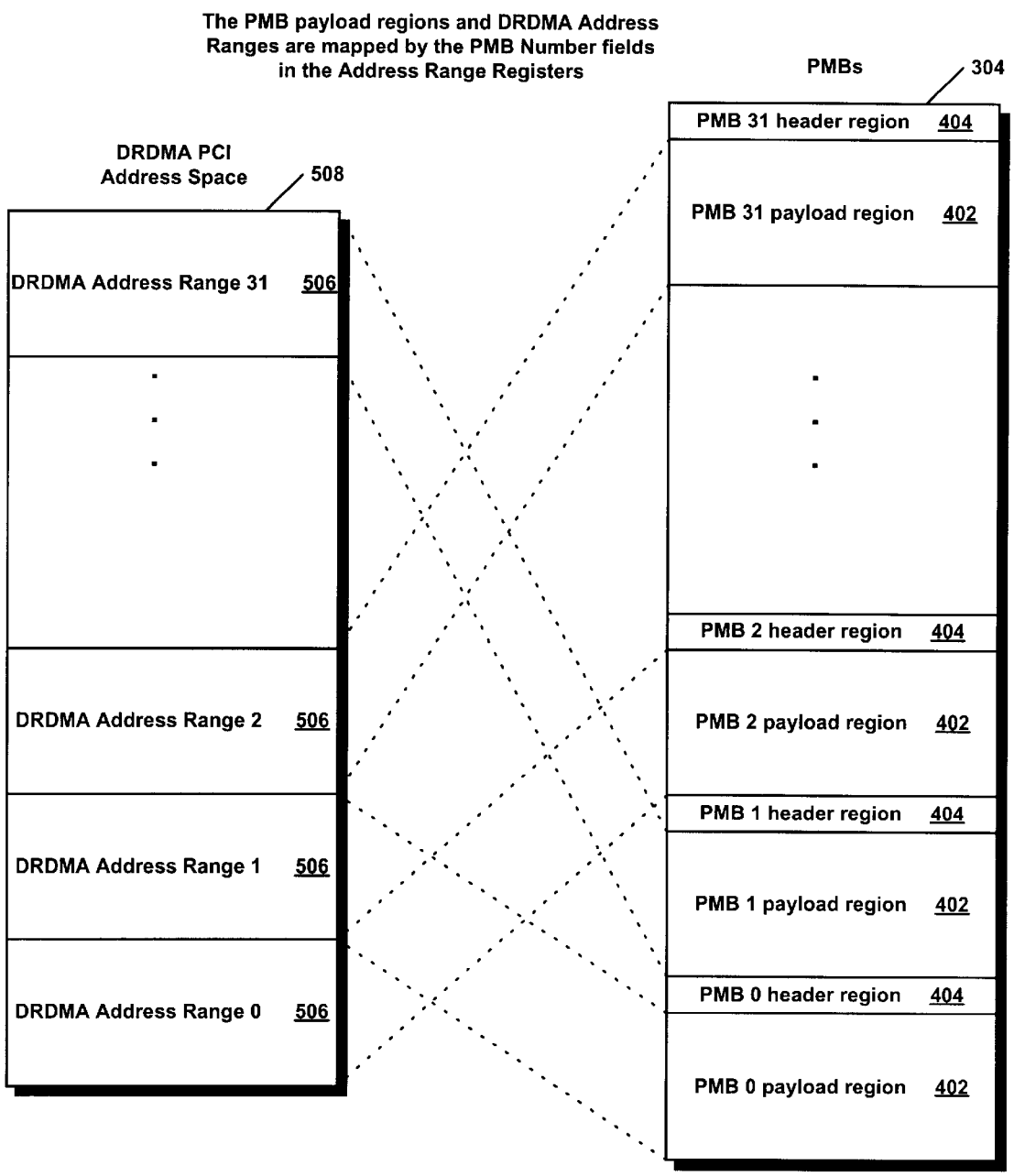
FIG. 19b is a block diagram illustrating the random mapping capability between the DRDMA Address Ranges of FIG. 5 and the PMB payload regions of FIG. 4 based on the Address Range Register PMB Number fields according to the present invention.
Figure 20:
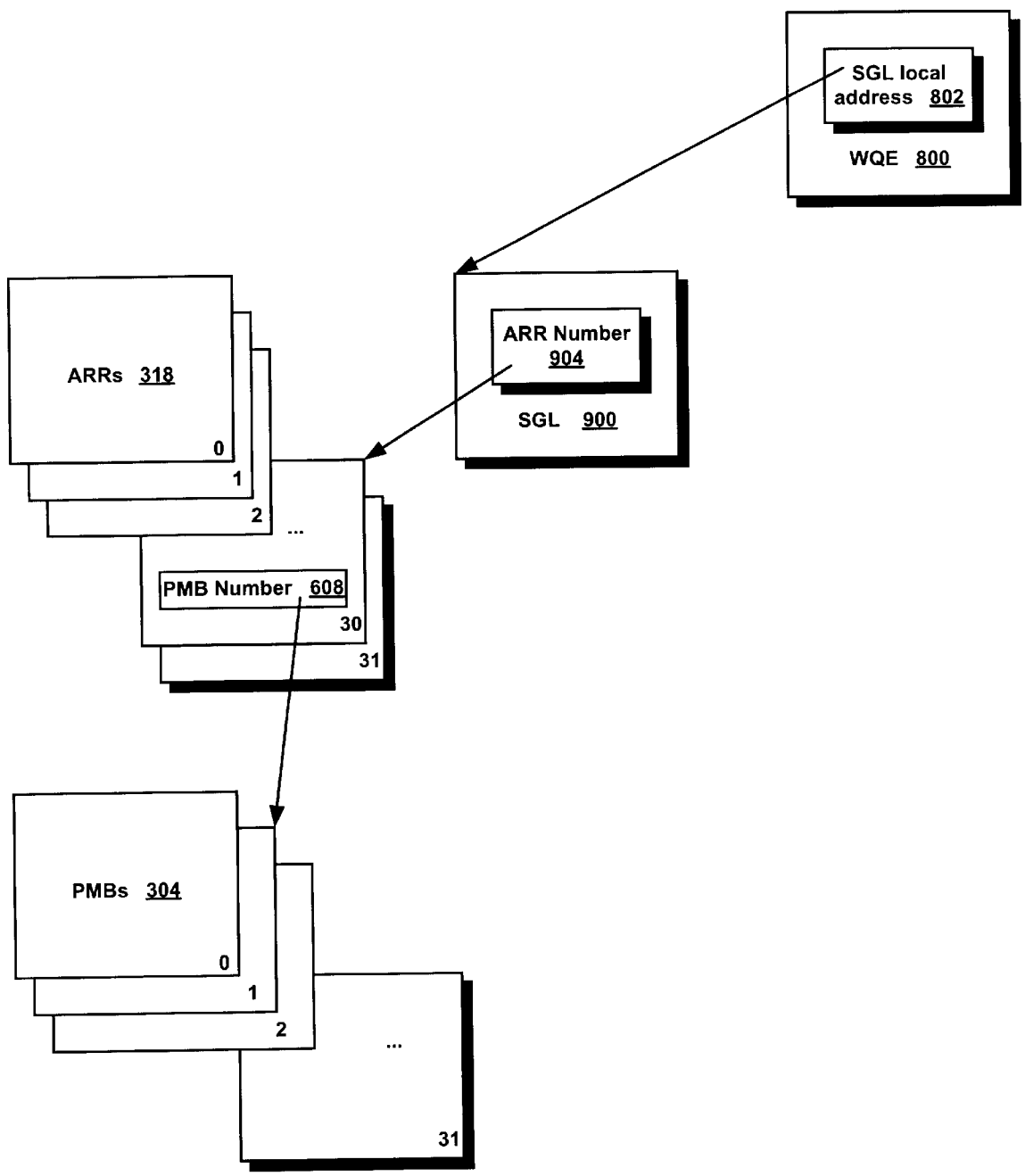
FIG. 20 is a block diagram illustrating Work Queue Element to Packet Memory Block translation according to the present invention.

Referring now to FIG. 19*b*, a block diagram illustrating the random mapping capability between the DRDMA Address Ranges 506 of FIG. 5 and the PMB payload regions 404 of FIG. 4 based on the Address Range Register 318 PMB Number fields 608 according to the present invention is shown. The example in FIG. 19*b* shows DRDMA Address Range 31 mapped to PMB 1 payload region 402, DRDMA Address Range 2 mapped to PMB 31 payload region 402, DRDMA Address Range 1 mapped to PMB 0 payload region 402 and DRDMA Address Range 0 mapped to PMB 2 payload region 402. Advantageously, the mapping between a DRDMA Address Range 506 and a PMB 304 may be randomly assigned, as shown. This enables the CPU 208 to allocate a DRDMA Address Range 506 in step 1804 of FIG. 18*a* independent from the Transaction Switch 302 allocating a PMB 304 for the DRDMA Address Range 506 in step 1822 of FIG. 18a, discussed below. This random mapping capability is facilitated by the PMB Number field 608 in the ARR 318, as shown in FIGS. 19a and 20.

Referring again to FIG. 18a, after determining the appropriate DRDMA Address Range 506 and corresponding ARR 318, the PCI I/F 312 examines the ARR 318 to determine that the PCI Valid bit 612 is set, in step 1816. Having determined the PCI Valid bit 612 is set, the PCI I/F 312 accepts data from the I/O controller 206 and transfers the data into the PMB 304 previously allocated during step 1822 by the Transaction Switch 302 discussed below, in step 1816. The PCI I/F 312 determines the correct PMB 304 to write the data to by examining the PMB Number field 608 of the ARR 318, as shown in FIGS. 19 and 20. As the PCI I/F 312 writes data bytes into the PMB 304, it continually updates the Write Byte Count field 604 in the ARR 318, in step 1816. Once the data transfer is complete, i.e. once the number of bytes specified in the Total Transfer Length field 602 has been transferred, the PCI I/F 312 clears the PCI Valid bit 612 and sets the BR Valid bit 614 in the ARR 318, in step 1816. Setting the BR Valid bit 614 informs the Bus Router 306 that it may transfer the data from the PMB 304 in a packet to the IB Requester, as discussed below.

In response to the CPU 208 writing the control register 326 during step 1808, and in parallel with step 1812, the Transaction Switch 302 allocates a free PMB 304 from the pool of free PMBs 304 that was allocated during step 1704 of FIG. 17, in step 1822. The Transaction Switch 302 then writes the number of the allocated PMB 304 into the Packet Memory Block Number field 608 of the ARR 318 corresponding to the DRDMA Address Range 506 Number received from the CPU 208 during step 1808, in step 1822. In one embodiment, the Transaction Switch 302 allocates multiple free PMBs 304 from the pool of free PMBs 304, in step 1822.

In response to the CPU 208 writing the control register 326 during step 1808, and in parallel with steps 1812 to 1816, the Bus Router 306 processes its WQs 712 of FIG. 7b and encounters the DRDMA Write WQE 800 submitted to the TCA 202 during step 1808 and processes the WQE 800 and associated SGL 900, in step 1824.

The Bus Router 306 determines from the ARR Number field 904 of the SGL 900 the ARR 318 associated with the WQE as shown in FIGS. 19 and 20, in step 1826. The Bus Router 306 queries the ARR 318, in parallel with steps 1812 to 1816, until the PCI I/F 312 has transferred the data from the I/O Controller 206 to the PMB 304, i.e., until step 1816 is complete, in step 1826. The Bus Router 306 determines that the data transfer has completed by looking to see if the BR Valid bit 614 is set and by comparing the Write Byte Count 604 field with the Total Transfer Length 602 field, in step 1826. Preferably, the Bus Router 306 queries the ARR 318 periodically concurrently with other functions, such as processing other WQEs in the QP 712.

When the Bus Router 306 determines that the data transfer is complete, the Bus Router 306 creates an RDMA Write packet 1100 in the PMB 304 into which the PCI I/F 312 wrote the data from the I/O controller 206 during step 1816, in step 1832. The Bus Router 306, in particular the TxPP logic 1414, creates the RDMA Write Request packet 1100 by writing the appropriate RDMA Write Request packet 1100 header in the header region 404 of the PMB 304, in step 1832. To determine the appropriate PMB 304 in which to create the RDMA Write Request packet 1100, the Bus Router 306 examines the PMB Number field 608 in the ARR 318, as shown in FIGS. 19 and 20, which was populated by the Transaction Switch 302 during step 1822.

The Bus Router 306 populates the Opcode field 1102 to indicate an RDMA Write packet type. The Bus Router 306 populates the Destination QP field 1104 with the HCA 104 destination QP number and the Source QP field 1106 with the TCA 202 QP number of the WQE created during step 1808. In the case of a reliable connection service class, the Source QP field 1106 will be the Destination QP field 1006 from the original I/O Read request SEND packet 1000 received during step 1802.

The Bus Router 306 populates the Virtual Address field 1108 with the host 102 virtual address 1008 received in the original SEND packet and the DMA Length field 1112 with the Total Length 906 from the SGL 900. The Bus Router 306 populates the R_Key field 1114 with an R_Key provided in the WQE 800. The payload field 1116 is the data transferred from the I/O controller 206.

After creating the RDMA Write Request packet 1100, the Bus Router 306 notifies the specified MAC 308 that the packet is ready for transmission, in step 1834. The MAC 308 transmits the packet 1100 to the host 102 that issued the original I/O Read request and notifies the Bus Router 306 that the packet 1100 has been transmitted, in step 1834. In response, the Bus Router 306 clears the BR Valid bit 614 in the ARR 318 to signify that the PMB 304 no longer has valid data, in step 1834.

The TCA 202 then notifies the CPU 208 of the completion of the DRDMA Write WQE 800 by placing a CQE 742 on the completion queue 718 of FIG. 7b, in step 1836. In response, the CPU 208 programs the TCA 202 to send the host 102 a completion status message, such as in a SEND packet 1000 including, for example, a SCSI STATUS byte, in step 1836.

Figure 18B:
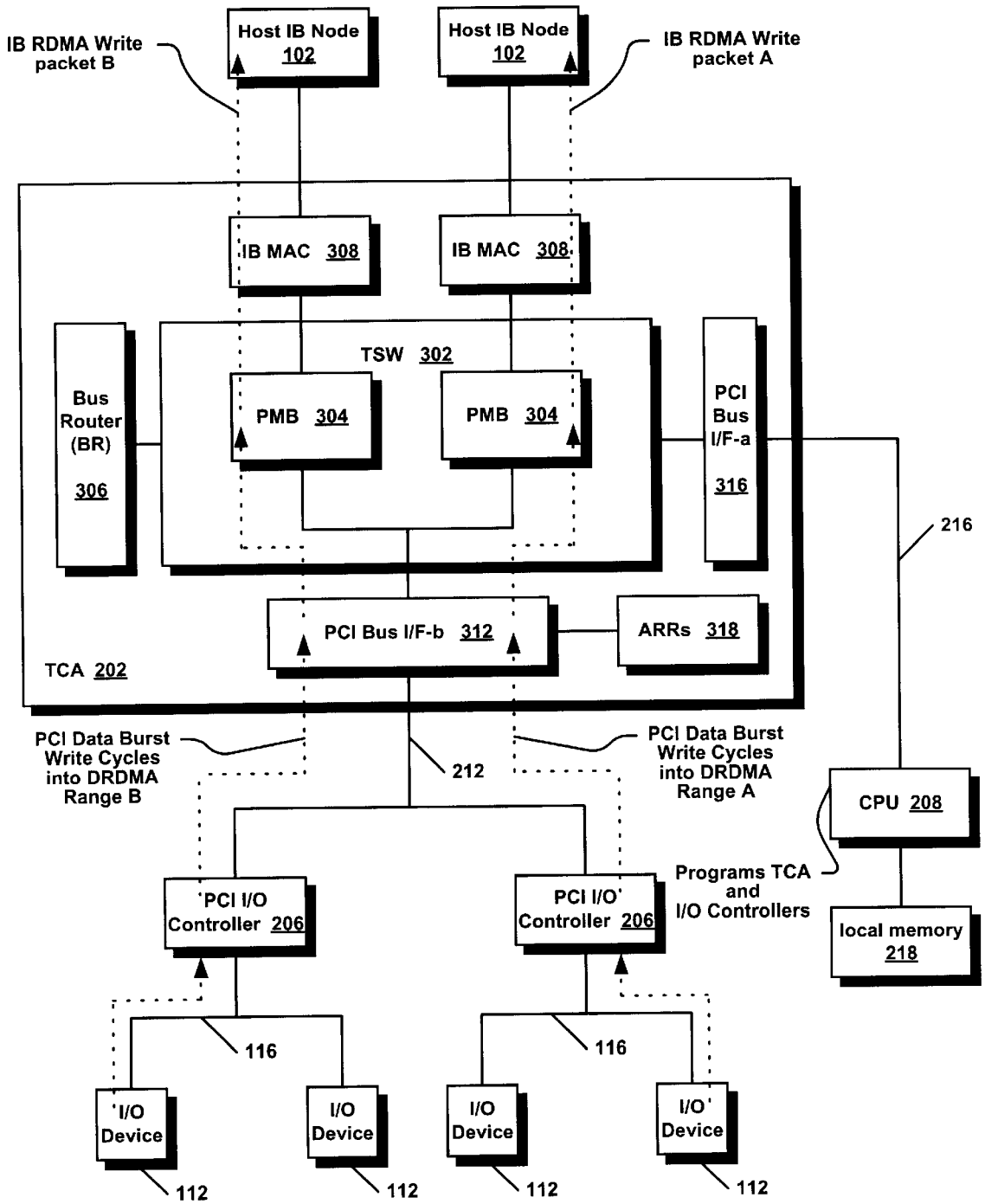
FIG. 18b is a block diagram illustrating the flow of data in a Direct RDMA Write operation of FIG. 18a according to the present invention.

Referring now to FIG. 18b, a block diagram illustrating the flow of data in a Direct RDMA Write operation of FIG. 18a according to the present invention is shown. In the embodiment shown in FIG. 18b, the DRDMA Write operation comprises data from multiple I/O devices 112 being transferred to multiple I/O controllers 206. The I/O controllers 206 perform burst data write cycles on PCI bus 212 to multiple DRDMA Address Ranges 506 associated with the ARRs 318 as previously programmed by the CPU 208. The PCI I/F 312 receives the PCI bursts and provides the data to multiple PMBs 304 in the Transaction Switch 302 based on the ARRs 318 and RDMA Write packet 1100 header sizes. The Bus Router 306 creates RDMA Write packets including the data in the PMBs 304. One or more MACs 308 transmit the RDMA Write packets 1100 to an IB host node 102. The DRDMA Write operation illustrated in FIG. 18b including data from multiple I/O devices 112 is advantageous, for example, in a RAID controller IB I/O unit 108 for transferring striped data to the host 102. As shown, the RDMA Write packets 1100 may be transmitted to a plurality of hosts 102 concurrently.

Figure 21:
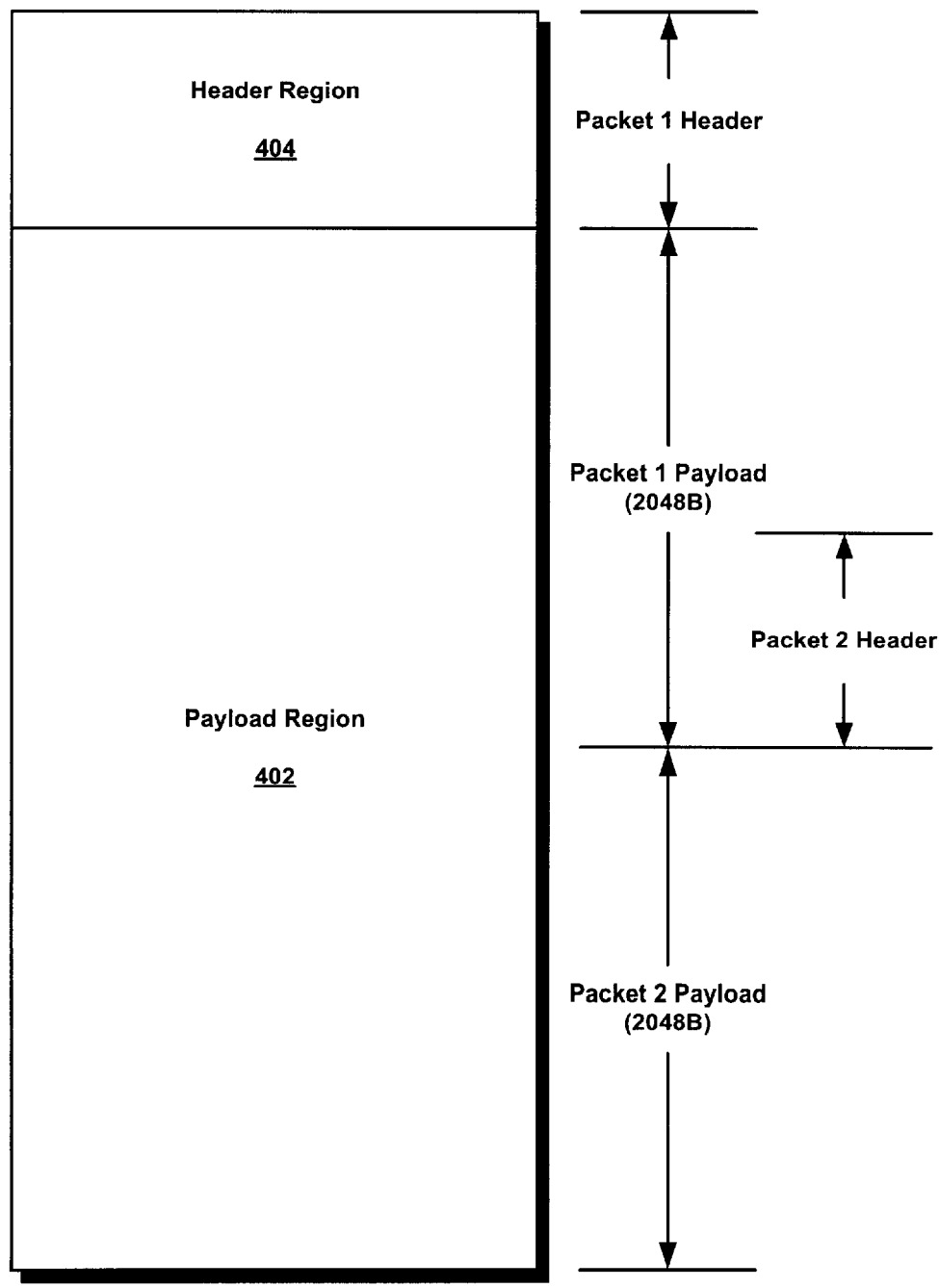
FIG. 21 is a block diagram illustrating IB packet header creation for an MTU smaller than the Packet Memory Block size according to the present invention.

Referring now to FIG. 21, a block diagram illustrating IB packet header creation for an MTU smaller than the size of a PMB 304 of Figure size according to the present invention is shown. If the Path MTU 808 from the WQE 800 of FIG. 8 size is smaller than the Total Length 906 of FIG. 9, then the TCA 202 must transmit multiple RDMA Write request packets to satisfy the I/O Read request.

The example shown if FIG. 21 assumes a Path MTU 808 of 2048 bytes and a Total Length 906 of FIG. 9 for this DRDMA Write operation of 4096 bytes. In this case, the TCA 202 must transmit two RDMA Write packets 1100 to the host 102. The payload data for packet 1, i.e., the first 2048 bytes of data, is transferred to the PMB 304 by the PCI I/F 312 in step 1816. The Bus Router 306 detects the data transfer completion in step 1826 and builds the header for packet 1 in step 1832 and the MAC 308 transmits packet 1 in step 1834. The Bus Router 306 stalls waiting for an indication that packet 1 has been successfully transmitted before it builds the header for packet 2, i.e., for the next 2048 bytes of data from the I/O controller 206. Once packet 1 has been transmitted, the Bus Router 306 builds the header for packet 2 over the end of the packet 1 payload region, as shown, which is allowable since packet 1 has already been transmitted.

Figure 22A:
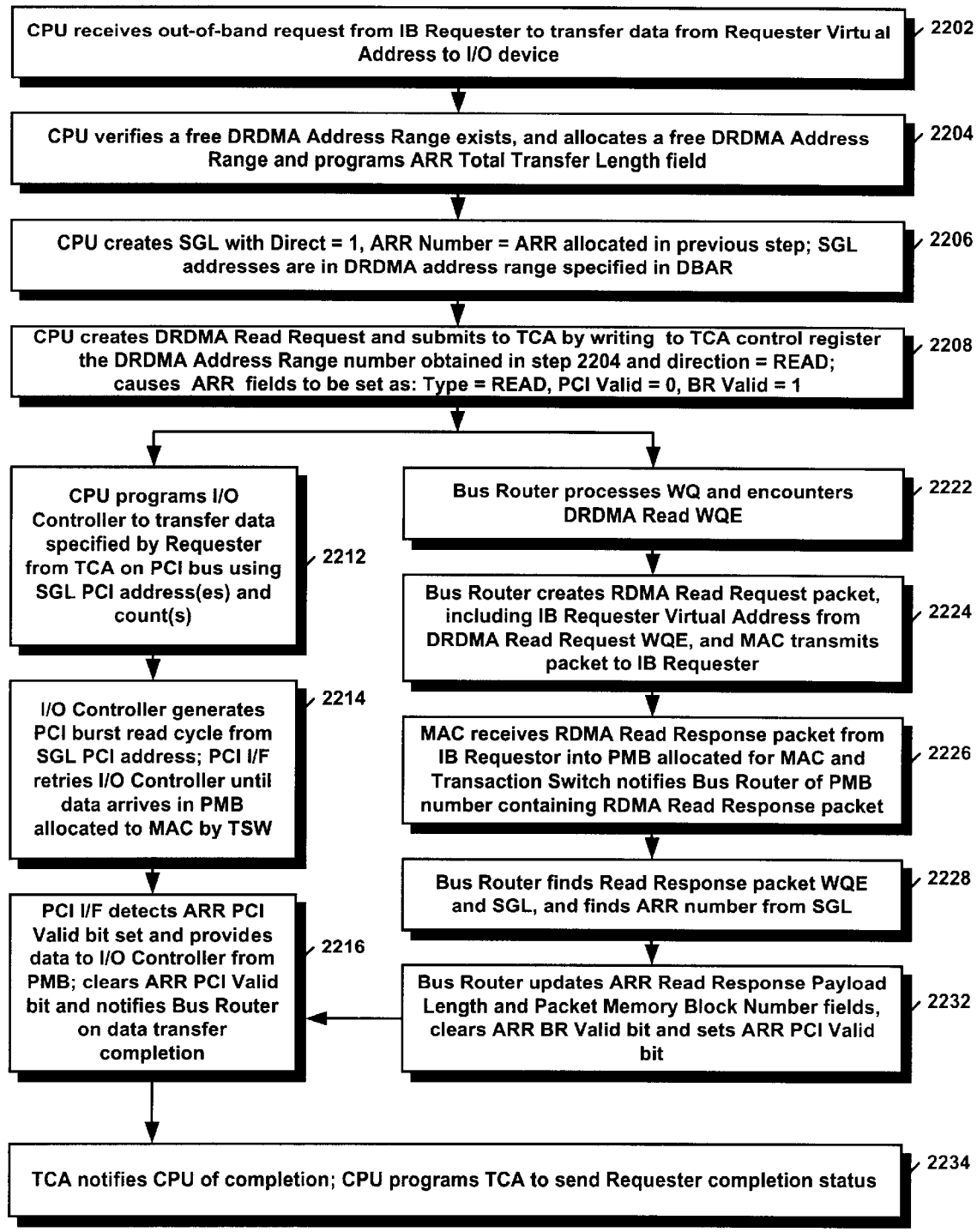
FIG. 22a is a flowchart illustrating a Direct RDMA Read operation according to the present invention.

Referring now to FIG. 22a, a flowchart illustrating a Direct RDMA Read operation according to the present invention is shown. FIG. 22a illustrates a DRDMA Read operation in the context of an I/O Write operation such as the I/O Write operation described in FIG. 16. The I/O Write operation described in FIG. 16 could be performed according to the conventional double buffering method by buffering data from the host 102 in an intermediate fashion in the local memory 218 and then the I/O controller 206 transfer the data from the local memory to the I/O device 112. However, it is the purpose of the Direct RDMA Read operation according to the present invention to avoid buffering the data in the local memory 218 thereby making more efficient use of the bandwidth of the PCI buses 212 and 216 and the local memory 218 as will be described now.

First, the CPU 208 of FIG. 2 is notified by the TCA 202 of the reception from an IB Requester, such as host 102 of FIG. 1, of an out-of-band I/O write request, such as the SEND packet 1000 of FIG. 15, in step 2202. The SEND packet 1000 received during step 2202 is similar to the SEND packet 1000 received during step 1802 of FIG. 18a, except that the I/O Command field 1014 includes an I/O write command, such as a SCSI WRITE CDB, rather than an I/O read command. That is, the I/O write command instructs the TCA 202 to transfer data from a virtual address in the host 102 memory 124 to an I/O device 112.

In response to the I/O write request, the CPU 208 verifies that at least one of the DRDMA Address Ranges 506 is free by examining the DRDMA Address Range Free List 1742, in step 2204, similar to the operation described in step 1804 of FIG. 18a.

Next, the CPU 208 creates a SGL 900 of FIG. 9, in step 2206, similar to the operation described in step 1806. Next, the CPU 208 creates a DRDMA Read WQE 800 of FIG. 8 and submits it to the TCA 202, in step 2208 similar to the operation described in 1808, except that the Operation Type field 802 indicates a DRDMA Read rather than a DRDMA Write. After the CPU 208 creates the WQE 800, the CPU 208 submits the WQE 800 to the TCA 202 by writing to a control register in the control/status registers 326 of FIG. 3, in step 2208. The CPU 208 writes the DRDMA Address Range 506 Number obtained in step 2204 to the TCA 202 and indicates the direction is a DRDMA READ, i.e. from the TCA 202 to PCI 212, in step 2208.

The write by the CPU 208 of the control register 326 during step 2208 sets the ARR 318 Type bit 616 to indicate a READ, i.e., read by PCI I/O controller 206 from PMB 304. The CPU 208 write also clears the ARR 318 PCI Valid bit 612 to indicate the DRDMA PCI Address Range 506 corresponding to the ARR 318 is invalid for PCI I/F 312 operations. That is, the PCI I/F 312 is not currently authorized to accept PCI burst read operations in the corresponding DRDMA Address Range 506 from the I/O Controller 206 and transfer data from the PMB 304 specified in the ARR 318 to an I/O controller 206 because the data has not yet arrived from a MAC 308. The CPU 208 write also sets the ARR 318 BR Valid bit 614 to indicate the DRDMA PCI Address Range 506 corresponding to the ARR 318 is valid for Bus Router 306 operations. That is, the Bus Router 306 may direct a transfer of data from a MAC 308 to the PMB 304 specified in the ARR 318.

After the CPU 208 submits the WQE 800 to the TCA 202, the CPU 208 programs the I/O Controller 206 to transfer data specified by the host 102 to the I/O device 112 specified in the I/O read request received during step 2202, in step 2212, similar to the operation described in step 1812 of FIG. 18a except the data transfer is in the opposite direction.

In response, the I/O controller 206 generates PCI burst read cycles on the PCI bus 212 to the PCI addresses specified in the SGL 900, in step 2214. The PCI I/F 312 detects the PCI burst read cycles generated by the I/O controller 206 during step 2214 and determines that the PCI burst addresses are in the DRDMA Address Space 508 based on the DBAR 322 programmed during step 1708, in step 2214. The PCI I/F 312 determines which of the particular DRDMA Address Ranges 506 the PCI burst address is directed toward according to the method shown in FIG. 19a.

The PCI I/F 312 generates PCI retry cycles to the I/O controller 206 until data from an RDMA Read Response packet, discussed with respect to steps 2226 to 2232 below, arrives in the PMB 304 allocated to a MAC 308, in step 2214. In another embodiment in which the PCI bus 112 is a PCI-X bus, the PCI I/F 312 generates a split transaction to indicate to the I/O controller 206 that the PCI I/F 312 will notify the I/O controller 206 when the data is available, thereby more efficiently utilizing the PCI bus 212.

In response to the CPU 208 writing the control register 326 during step 2208, and in parallel with steps 2212 to 2216, the Bus Router 306 processes its WQs 712 of FIG. 7b and encounters the DRDMA Read WQE 800 submitted to the TCA 202 during step 2208 and processes the WQE 800 and associated SGL 900, in step 2222.

The Bus Router 306 processes the DRDMA Read WQE 800 first by creating an RDMA Read Request packet 1200 of FIG. 12 based on the information in the DRDMA Read WQE 800 and directs a MAC 308 to transmit the packet 1200 to the host 102, in step 2224. In particular, the RDMA Read Request packet 1200 includes the virtual address 1008 received in the original SEND packet 1000 received during step 2202.

The HCA 104 receives the RDMA Read Request packet 1200 and in response transmits a RDMA Read Response packet 1300 to the TCA 202. A MAC 308 receives the RDMA Read Response packet 1300 and stores the packet 1300 into a PMB 304 allocated for the MAC 308 and the MAC 308 notifies the Transaction Switch 302 of the packet 1300 reception, in step 2226. In response, the Transaction Switch 302 notifies the Bus Router 306 of the packet reception and provides the Bus Router 306 the PMB 304 number containing the packet 1300, in step 2226. In response, the Bus Router 306 finds the WQE 800 and SGL 900 associated with the incoming RDMA Read Response packet 1300 according to the method shown in FIG. 23, in step 2228.

Figure 22B:
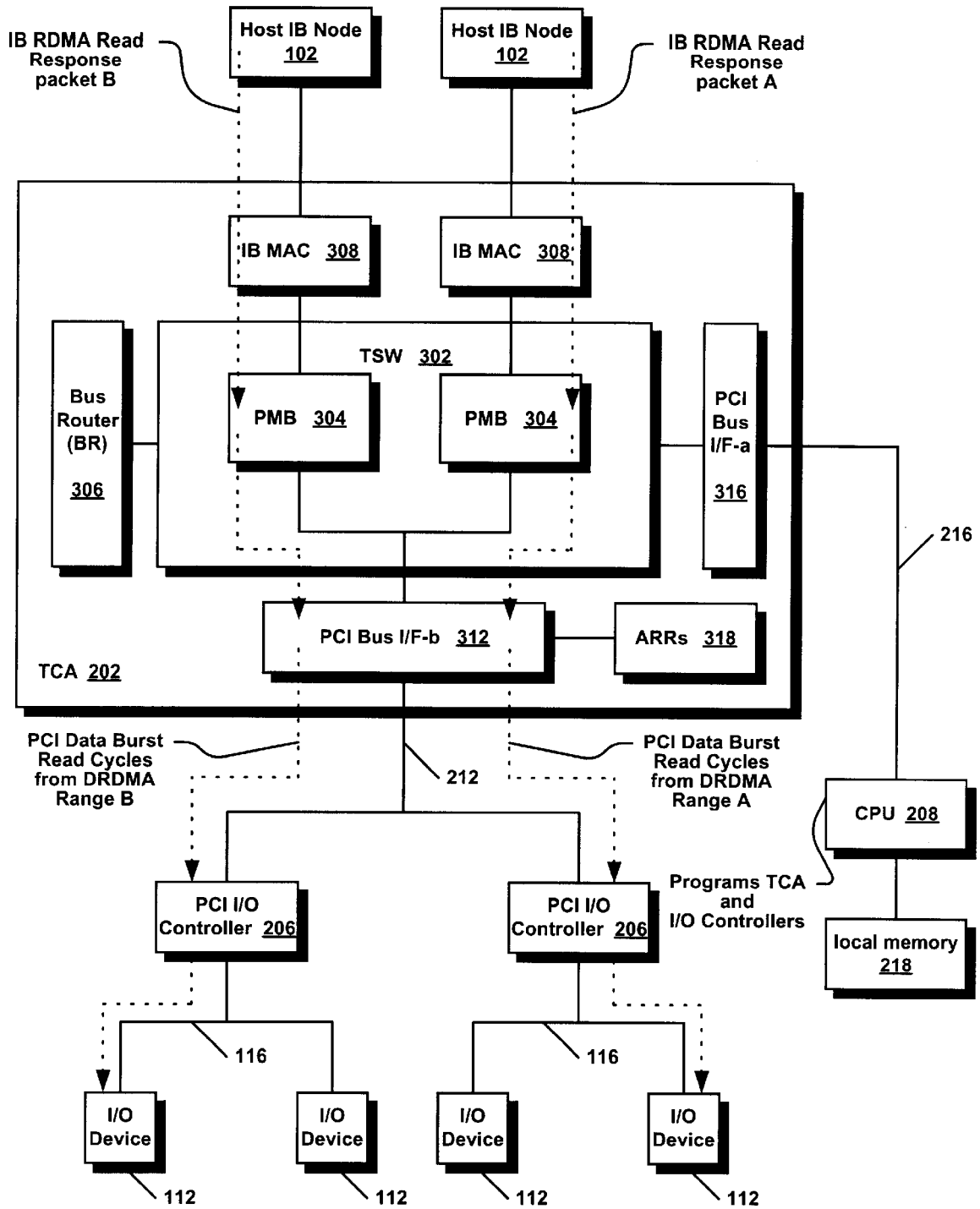
FIG. 22b is a block diagram illustrating the flow of data in a Direct RDMA Read operation of FIG. 22a according to the present invention.

Referring now to FIG. 22b, a block diagram illustrating the flow of data in a Direct RDMA Read operation of FIG. 22a according to the present invention is shown. In the embodiment shown in FIG. 22b, the DRDMA Read operation comprises transmission of one or more IB RDMA Read Response packets 1300 from an IB host node 102. The packets 1300 are received by one or more MACs 308 in the TCA 202 and provided to PMBs 304 in the Transaction Switch 302. One or more PCI I/O controllers 206 generate burst data read cycles on PCI bus 212 from multiple DRDMA Address Ranges 506 associated with the ARRs 318 as previously programmed by the CPU 208. The Bus Router 306 examines the packets 1300 and notifies the PCI I/F 312 as to which PMBs 304 contain the packets 1300. The PCI I/F 312 fetches the requested data in the payload of the packets 1300 in the PMBs 304 based on the RDMA Read packet 1300 header sizes and provides the requested data to the one or more I/O controllers 206 on the PCI bus 212. The I/O controllers 206 receive the data and provide the data to one or more I/O devices 112 in response to previous programming by the CPU 208. The DRDMA Read operation illustrated in FIG. 22*b* including data from multiple I/O devices 112 is advantageous, for example, in a RAID controller IB I/O unit 108 for transferring data from the host 102 to the I/O devices 112 in a striped fashion. As shown, the RDMA Read packets 1300 may be received from a plurality of hosts 102 concurrently.

Figure 23:
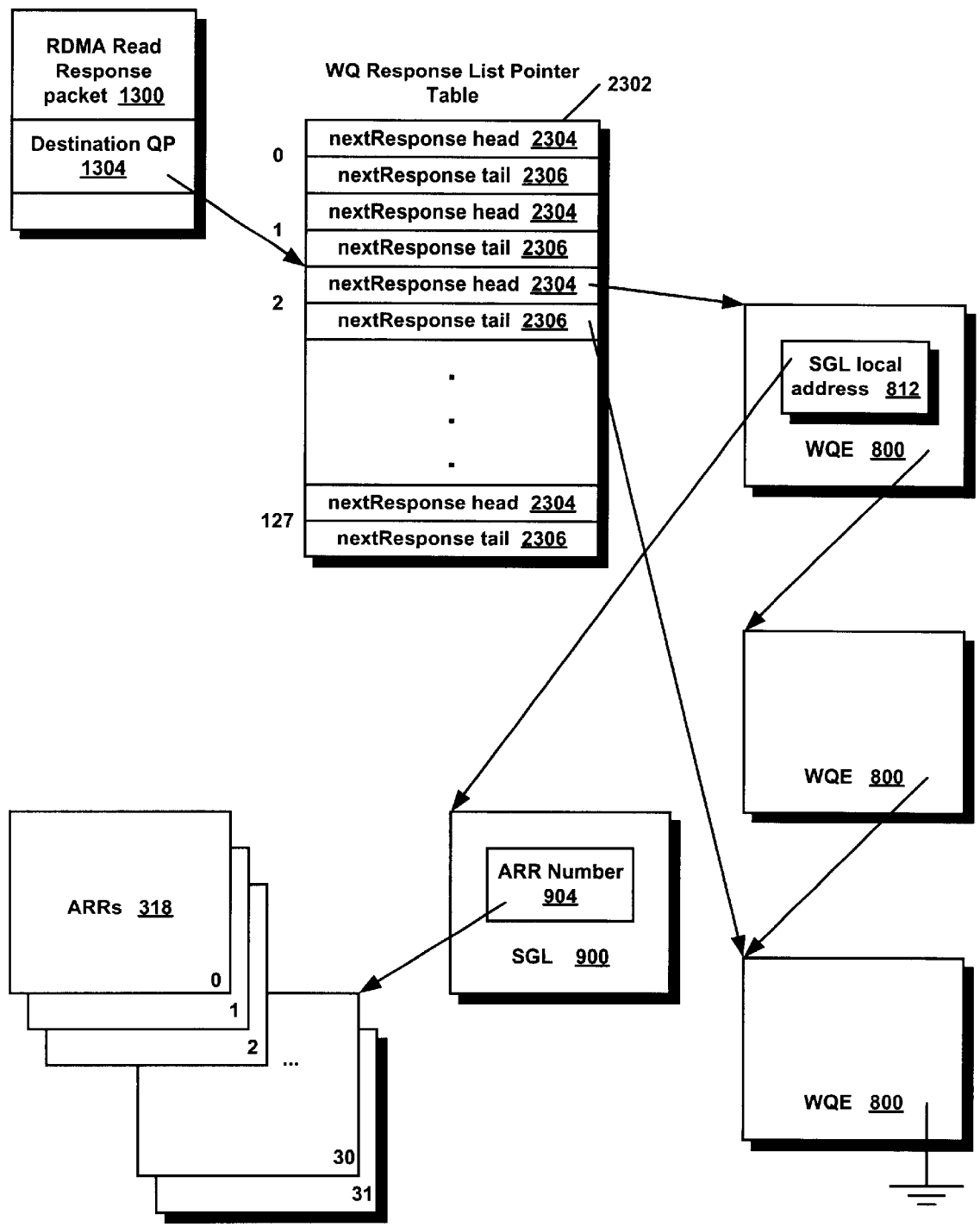
FIG. 23 is a block diagram illustrating translation to an Address Range Register from an incoming RDMA Read Response packet.

Referring now to FIG. 23, a block diagram illustrating translation to an ARR 318 from an incoming RDMA Read Response packet 1300 is shown. The Work Queue Management logic 1412 of FIG. 14 maintains a WQ Read Response List Pointer Table 2302. The Table 2302 includes an entry for each WQ 712 of the TCA 202. The Table 2302 is indexed by the Destination QP 1304 field of the RDMA Read Response packet 1300. Each entry in the Table 2302 includes a head 2304 and tail 2306 pointer for keeping a list of WQEs 800 in the indexed WQ 712 for which one or more RDMA Read Response packets 1300 the TCA 202 expects to receive in response to an RDMA Read Request packet 1200 previously transmitted. Each time the TCA 202 transmits an RDMA Read Request packet 1200 from a WQ 712, the Bus Router 306 places the associated WQE 800 at the end of the WQ Response List in the WQ Response List Pointer Table 2302 entry associated with the WQ 712.

Each time the Bus Router 306 is notified of the reception of an RDMA Read Response packet 1300, the Bus Router 306 looks up the entry in the WQ Response List Pointer Table 2302 indexed by the Destination QP field 1304, in step 2228. The Bus Router 306 then finds the WQE 800 at the head of the indexed list, which is the WQE 800 associated with the received RDMA Read Response packet 1300, in step 2228. This is because the host 102 is required by IBA to return RDMA Read Response packets 1300 in the order their associated RDMA Read Request packets 1200 were submitted. The Bus Router 306 then removes the found WQE 800 from the response list, in step 2228.

The Bus Router 306 then follows the SGL local address field 812 of the WQE 800 to the associated SGL 900, in step 2228. If the Direct bit 902 of the SGL 900 is set, then the WQE 800 is associated with a DRDMA Read operation. That is, the WQE 800 is a DRDMA Read WQE 800 that caused the generation of an RDMA Read Request packet 1200 that was transmitted during step 2224. In this case, the Bus Router 306 follows the ARR Number field 904 of the SGL 900 to the appropriate ARR 318, in step 2228, as shown.

Referring again to FIG. 22*a*, from the SGL 900 ARR Number field 904, the Bus Router 306 determines the ARR 318 associated with the incoming RDMA Read Response packet 1300, in step 2228, as shown in FIG. 23 and discussed above.

The Bus Router 306 updates the Read Response Payload Length field 606 in the ARR 318 with the payload size specified in the RDMA Read Response packet 1300 header, in step 2232. In addition, the Bus Router 306 updates the PMB Number field 608 in the ARR 318 with the PMB number received from the Transaction Switch 302 during step 2226, in step 2232. Finally, the Bus Router 306 clears the ARR 318 BR Valid bit 614 and sets the ARR 318 PCI Valid bit 612 to indicate to the PCI I/F 312 that the data is available in the PMB 304 for transfer to the I/O controller 206, in step 2232.

The PCI I/F 312 detects that the ARR 318 PCI Valid bit 612 is set and consequently stops retrying the I/O controller 206 and begins satisfying the PCI burst read cycles to the I/O controller 206 with data from the PMB 304, in step 2216. The PCI burst address to PMB 304 address translation performed by the PCI I/F 312 is described in FIG. 19*a*. Once the transfer of the data from the PMB 304 to the I/O controller 206 is complete, the PCI I/F 312 clears the ARR 318 PCI Valid bit 612 and notifies the Bus Router 306, in step 2216.

The TCA 202 then notifies the CPU 208 of the completion of the DRDMA Read WQE 800 by placing a CQE 742 on the completion queue 718 of FIG. 7*b*, in step 2234. In response, the CPU 208 programs the TCA 202 to send the host 102 a completion status message, such as in a SEND packet 1000 including, for example, a SCSI STATUS byte, in step 2234.

If the Path MTU 808 is smaller than the DMA Length 1212 specified in the RDMA Read Request packet 1200 transmitted to the HCA 104, then the HCA 104 will return multiple RDMA Read Response 1300 packets. In this situation, steps 2226, 2228, 2232 and 2216 will be repeated for each RDMA Read Response packet 1300 transmitted from the HCA 104. For example, if the DRDMA Read Request DMA Length 1212 is 4096 and the MTU size 808 is the IB minimum of 256 bytes, then the number of RDMA Read Response packets 1300 that will be received to satisfy the DRDMA Read Request is 16, and steps 2226, 2228, 2232 and 2216 will be repeated 16 times. Each time the Bus Router 306 is notified of the reception of an RDMA Read Response packet 1300, the Bus Router 306 verifies that the data in the PMB 304 for the packet ahead of it has been transferred by the PCI I/F 312 before performing step 2232.

In this situation, the CPU 208 populates the SGL 900 differently in step 2206 than in the normal situation. The CPU 208 populates a number of Local Address/Local Length pairs equal to the number of RDMA Read Response packets 1300 that will be transmitted by the host 102. If more than four RDMA Read Response packets 1300 will be transmitted by the host 102, then the CPU 208 links together multiple SGLs 900 to satisfy the request. The CPU 208 populates each of the Local Address fields 912 to 918 with the same value, i.e., with the PCI address of the DRDMA Address Range 506 obtained during step 2204 as in the normal case. However, the CPU 208 populates the Local Length fields 922 to 928 with the Path MTU 808 value. In the case of last Local Length field in the SGL 900, if the Total Length 906 is not a multiple of the Path MTU 808, then the CPU 208 populates the field with the Total Length 906 modulo the Path MTU 808. That is, the CPU 208 populates the field with the payload length of the last RDMA Read Response packet 1300 that the host 102 will send, which will be the remainder of the Total Length 906 not accounted for in the previous Local Address/Length pairs of the SGL 900.

As may be seen from the foregoing disclosure, the Direct RDMA operations of the present invention advantageously enable multiple IB hosts to concurrently perform I/O operations with I/O devices coupled to the I/O unit. Furthermore, each IB host may concurrently perform multiple I/O operations with the I/O devices coupled to the I/O unit. Additionally, each IB host may have a virtual address space from which to specify virtual addresses for RDMA operations that overlaps the virtual address space in other IB hosts transacting with the I/O unit. That is, the present invention is capable of operating in an IB SAN beyond an IB SAN having only one IB host and one I/O Unit.

Although the present invention and its objects, features, and advantages have been described in detail, other embodiments are encompassed by the invention. For example, the local bus coupling the TCA to the I/O controllers and local CPU and memory need not be a PCI local bus. Rather, the present invention is adaptable to any of a number of local buses. In addition, the present invention may also be used in an IB Host Channel Adapter, and is not limited to an IB TCA environment. In particular, the present invention may be employed in a Host Channel Adapter for use in performing host-to-host communication to reduce host memory bandwidth consumption by avoiding double buffering the data transmitted between the hosts. Finally, various of the functions performed by the local CPU are capable of being integrated into the TCA, rather than being performed by a processor external to the TCA.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. An Infiniband channel adapter, comprising:
   a local bus interface, for coupling the channel adapter to an I/O controller by a local bus, configured to receive data from the I/O controller if a local bus address of said data is within a predetermined address range of the local bus address space; and
   a bus router, in communication with said local bus interface, configured to create an Infiniband remote direct memory access (RDMA). Write packet including said data in response to said local bus interface receiving said data from the I/O controller for transmission to a remote Infiniband node previously requesting said data.

2. The Infiniband channel adapter of claim 1, further comprising:
   a plurality of programmable registers, corresponding to a plurality of address sub-ranges within said predetermined address range of the local bus address space.

3. The Infiniband channel adapter of claim 2, wherein said bus router is further configured to associate said local bus address with a work queue element based on which one of said plurality of address sub-ranges said local bus address is within.

4. The Infiniband channel adapter of claim 3, wherein said work queue element includes a virtual address of a location in a memory in the remote Infiniband node for storing said data received from the I/O controller.

5. The Infiniband channel adapter of claim 4, wherein said bus router is further configured to populate a virtual address field in said Infiniband RDMA Write packet with said virtual address in said work queue element.

6. The Infiniband channel adapter of claim 2, wherein each of said plurality of programmable registers includes a transfer length portion, for indicating a quantity of said data to be provided by the I/O controller for inclusion in said Infiniband RDMA Write packet.

7. The Infiniband channel adapter of claim 6, wherein each of said plurality of programmable registers further includes a count portion for indicating a quantity of said data currently transferred from the I/O controller to the channel adapter by said local bus interface.

8. The Infiniband channel adapter of claim 7, wherein said bus router is further configured to transmit said Infiniband RDMA Write packet to the remote Infiniband node in response to said count portion being equal to said transfer length portion.

9. The Infiniband channel adapter of claim 2, wherein each of said plurality of programmable registers includes a valid indicator, wherein said local bus interface is configured to receive said data from the I/O controller only if said valid indicator is programmed to a predetermined value.

10. The Infiniband channel adapter of claim 2, further comprising:
    a memory, coupled to said local bus interface, for receiving said data from said local bus interface.

11. The Infiniband channel adapter of claim 10, wherein each of said plurality of programmable registers includes a block number portion, wherein said block number portion specifies one of a plurality of blocks within said memory for storing Infiniband RDMA Write packets.

12. The Infiniband channel adapter of claim 11, wherein said local bus interface is configured to translate said local bus address into an address of a location within one of said plurality of blocks within said memory specified by said block number portion.

13. The Infiniband channel adapter of claim 12, wherein said local bus interface is configured to translate said local bus address into said memory block address based on a size of a header of said Infiniband RDMA Write packet.

14. The Infiniband channel adapter of claim 11, wherein said local bus interface is configured to translate said local bus address into said memory block address based on a size of said plurality of address sub-ranges.

15. The Infiniband channel adapter of claim 1, wherein said local bus interface is a PCI bus interface.

16. The Infiniband channel adapter of claim 1, further comprising:
    a programmable configuration register, for specifying a base address and length of said predetermined address range of the local bus address space.

17. The Infiniband channel adapter of claim 1, wherein said local bus interface is further configured to receive second data from a second I/O controller if a second local bus address of said second data is within said predetermined address range of the local bus address space, wherein said bus router is further configured to include said second data in said Infiniband RDMA Write packet.

18. An Infiniband channel adapter, comprising:
    a bus router, configured to receive an Infiniband RDMA Read Response packet, having a payload of data, transmitted by a remote Infiniband node; and
    a local bus interface, in communication with said bus router, configured to provide said payload of data to an I/O controller coupled to said local bus interface by a local bus if a local bus address specified by the I/O controller is within a predetermined address range of the local bus address space.

19. The Infiniband channel adapter of claim 18, further comprising:
    a plurality of programmable registers, corresponding to a plurality of address sub-ranges within said predetermined address range of the local bus address space.

20. The Infiniband channel adapter of claim 19, wherein each of said plurality of programmable registers includes a valid indicator, wherein said bus router is configured to set said valid indicator upon reception of said Infiniband RDMA Read Response packet.

21. The Infiniband channel adapter of claim 20, wherein said local bus interface is configured to provide said data to the I/O controller in response to said valid indicator being set by said bus router.

22. The Infiniband channel adapter of claim 19, wherein each of said plurality of programmable registers includes a payload length portion, wherein said bus router is configured to store a length of said payload of data of said Infiniband RDMA Read Response packet in said payload length portion of said programmable register in response to reception of said packet.

23. The Infiniband channel adapter of claim 19, wherein said bus router is configured to locate a work queue element associated with said Infiniband RDMA Read Response packet in response to reception of said packet, wherein said work queue element includes an indication of which of said plurality of address sub-ranges is allocated to said Infiniband RDMA Read Response packet.

24. The Infiniband channel adapter of claim 19, further comprising:
   a memory, coupled to said local bus interface, for receiving said Infiniband RDMA Read Response packet.

25. The Infiniband channel adapter of claim 24, wherein each of said plurality of programmable registers includes a block number portion, wherein said block number portion specifies one of a plurality of blocks within said memory for storing Infiniband RDMA Read Response packets.

26. The Infiniband channel adapter of claim 25, wherein said bus router is configured to store in said block number portion an indication of which of said plurality of blocks said Infiniband RDMA Read Response packet is stored in.

27. The Infiniband channel adapter of claim 18, wherein said local bus interface is configured to command the I/O controller to retry a request for said payload of data if said Infiniband RDMA Read Response packet has not been received by said bus router.

28. The Infiniband channel adapter of claim 18, wherein said local bus interface is configured to provide a first portion of said payload of data to the I/O controller and to provide a second portion of said payload of data to a second I/O controller coupled to said local bus interface if a second local bus address specified by the second I/O controller is within said predetermined address range of the local bus address space.

29. An Infiniband I/O unit, comprising:
   an Infiniband channel adapter;
   an I/O controller, coupled to said channel adapter by a local bus; and
   a processor, for programming said I/O controller to transfer data to said channel adapter on the local bus at an address within a predetermined address range of the local bus address space dedicated for direct data transfers from said I/O controller to said channel adapter;
   wherein said channel adapter is configured to receive said data from said I/O controller and to create an Infiniband RDMA Write packet including said data for transmission to a remote Infiniband node only if said address is within said predetermined address range.

30. The Infiniband I/O unit of claim 29, wherein said processor is further configured to provide to said channel adapter a virtual address of a memory location in the remote Infiniband node for inclusion by said channel adapter in said Infiniband RDMA Write packet.

31. The Infiniband I/O unit of claim 29, wherein said processor is further configured to allocate one of a plurality of address sub-ranges of said predetermined address range to a work queue element containing information used to create said Infiniband RDMA Write packet.

32. The Infiniband I/O unit of claim 29, wherein said channel adapter comprises a memory for receiving said data from said I/O controller.

33. The Infiniband I/O unit of claim 32, wherein said channel adapter is further configured to create said Infiniband RDMA Write packet including said data within said memory.

34. The Infiniband I/O unit of claim 29, wherein said processor is configured to program said I/O controller to transfer said data to said channel adapter at said address and to program said channel adapter to receive said data from said I/O controller and to create said Infiniband RDMA Write packet in response to receiving an out-of-band I/O read request Infiniband packet from the remote Infiniband node.

35. An Infiniband I/O unit, comprising:
   an Infiniband channel adapter, for receiving an Infiniband RDMA Read Response packet including a payload of data transmitted from a remote Infiniband node;
   an I/O controller, coupled to said channel adapter by a local bus; and
   a processor, for programming said I/O controller to transfer said data in said payload from said channel adapter on the local bus at an address within a predetermined address range of the local bus address space dedicated for direct data transfers from said channel adapter to said I/O controller;
   wherein said channel adapter is configured to provide said data to said I/O controller only if said address is within said predetermined address range.

36. The Infiniband I/O unit of claim 35, wherein said processor is further configured to program said channel adapter to transmit an Infiniband RDMA Read Request packet to the remote Infiniband node in response to reception of an out-of-band I/O write request from the remote Infiniband node prior to receiving said Infiniband RDMA Read Response packet.

37. The Infiniband I/O unit of claim 35, wherein said channel adapter is further configured to determine from said Infiniband RDMA Read Response packet which of a plurality of address sub-ranges of said predetermined address range was previously allocated for use by said I/O controller for transferring said data.

38. A method for translating Infiniband remote virtual addresses to local addresses, comprising:
   receiving in a first Infiniband packet a first virtual address of a first memory location in a remote Infiniband node, by a local Infiniband node;
   allocating a local address within a local address space of a local bus on said local node for transferring first data directly between an I/O controller of said local node and an Infiniband channel adapter of said local node in response to said receiving said first virtual address;
   receiving in a second Infiniband packet a second virtual address of a second memory location in said remote Infiniband node, by said local Infiniband node, wherein said first and second virtual addresses are spatially disparate; and
   allocating said local address for transferring second data directly between said I/O controller and said channel adapter in response to said receiving said second virtual address.

39. The method of claim 38, further comprising:

programming a configuration register for specifying an address range within said local address space dedicated to direct transfers of data between said I/O controller and said channel adapter, wherein said local address is within said address range, prior to said receiving said first virtual address.

40. A method for translating Infiniband remote virtual addresses to local addresses, comprising:

receiving in a first Infiniband packet a first virtual address of a first memory location in a first remote Infiniband node, by a local Infiniband node;

allocating a local address within a local address space of a local bus on said local node for transferring first data directly between an I/O controller of said local node and an Infiniband channel adapter of said local node in response to said receiving said first virtual address;

receiving in a second Infiniband packet a second virtual address of a second memory location in a second remote Infiniband node, by said local Infiniband node; and allocating said local address for transferring second data directly between said I/O controller and said channel adapter in response to said receiving said second virtual address.

41. A method for translating Infiniband remote virtual addresses to local addresses, comprising:

receiving in a first Infiniband packet a virtual address of a memory location in a remote Infiniband node, by a local Infiniband node;

allocating a first local address within a local address space of a local bus on said local node for transferring first data directly between an I/O controller of said local node and an Infiniband channel adapter of said local node in response to said receiving said virtual address in said first packet;

receiving in a second Infiniband packet said virtual address of said memory location in said remote Infiniband node, by said local Infiniband node; and allocating a second local address for transferring second data directly between said I/O controller and said channel adapter in response to said receiving said virtual address in said second packet.

* * * * *

UNITED STATES PATENT AND TRADEMARK OFFICE
CERTIFICATE OF CORRECTION

PATENT NO. : 6,594,712 B1
DATED : July 15, 2003
INVENTOR(S) : Christopher J. Pettey and Lawrence Rubin It is certified that error appears in the above-identified patent and that said Letters Patent is hereby corrected as shown below:

Title page, Item [54] and Column 1, line 1,
Title, should read -- INFINIBAND CHANNEL ADAPTER FOR PERFORMING DIRECT DMA BETWEEN PCI BUS AND INFINIBAND LINK --.

Signed and Sealed this

Twenty-fourth Day of January, 2006

JON W. DUDAS
*Director of the United States Patent and Trademark Office*